(12) United States Patent
Feit et al.

(10) Patent No.: US 8,321,370 B2
(45) Date of Patent: Nov. 27, 2012

(54) METHOD AND SYSTEM FOR TRANSLATING LOGICAL CONSTRAINTS TO LINEAR CONSTRAINTS

(75) Inventors: Sidnie Feit, New Haven, CT (US); James Hugh Johnson, Boston, MA (US)

(73) Assignee: The Standish Group International, Inc., Boston, MA (US)

( * ) Notice: Subject to any disclaimer, the term of this patent is extended or adjusted under 35 U.S.C. 154(b) by 846 days.

(21) Appl. No.: 12/399,659

(22) Filed: Mar. 6, 2009

(65) Prior Publication Data

US 2009/0228252 A1    Sep. 10, 2009

Related U.S. Application Data

(60) Provisional application No. 61/034,224, filed on Mar. 6, 2008.

(51) Int. Cl.
*G06F 17/10*    (2006.01)
(52) U.S. Cl. .............................................. 706/57; 703/2
(58) Field of Classification Search .................... 706/57; 707/1; 716/16
See application file for complete search history.

(56) References Cited

U.S. PATENT DOCUMENTS 7,644,377 B1 *    1/2010    Saxe et al. ..................... 716/106
2004/0153435 A1 *    8/2004    Gudbjartsson et al. ........... 707/1

OTHER PUBLICATIONS

Blair, C. E.; Jeroslow, R. G.; Lowe, J. K., Some Results and Experiments in Programming Techniques for Propositional Logic, Computers and Operations Research, May 1986, pp. 633-645, vol. 13, Issue 5.
Hooker, J. N., A Quantitative Approach to Logical Inference, Decision Support Systems, Mar. 1988, pp. 45-69, vol. 4, Issue 1.
Tom M. Cavalier, Panos M. Pardalos, and Allen L. Soyster, Modeling and Integer Programming Techniques Applied to Propositional Calculus, Computers Opns Res., 1990, pp. 561-570, vol. 17, No. 6.

* cited by examiner

*Primary Examiner* — Alan Chen
*Assistant Examiner* — Ola Olude Afolabi
(74) *Attorney, Agent, or Firm* — Lando & Anastasi, LLP

(57) ABSTRACT

A system and method is provided for translating one or more logical expressions E is TRUE, or statements of the form IF E1 is TRUE THEN E2 is TRUE, to a set of linear constraints. Examples in accordance with the present invention contribute to systems and methods for solving optimization problems that include constraints in the form of arbitrarily complex logical relationships between binary variables. Examples are also applicable to solving general optimization problems that have arbitrarily complex relationships between sets of linear constraints. The systems and methods combine simplification and ordering of logical expressions, factorization, direct translations of expressions, substitution of auxiliary variables, and substitution of auxiliary variables for phrases that would otherwise lead to an unacceptable number of linear constraints. The systems and methods also include mechanisms that reduce the number of required auxiliary variables by use of simplification, consolidation, Boolean identities, and auxiliary variable reuse.

32 Claims, 14 Drawing Sheets

METHOD AND SYSTEM FOR TRANSLATING LOGICAL CONSTRAINTS TO LINEAR CONSTRAINTS

RELATED APPLICATIONS

This application claims priority under 35 U.S.C. §119(e) to U.S. Provisional Application Ser. No. 61/034,224, entitled "METHOD AND SYSTEM FOR SOLVING OPTIMIZATION PROBLEMS WITH LOGICAL DEPENDENCIES," filed on Mar. 6, 2008, which is herein incorporated by reference in its entirety.

BACKGROUND

1. Technical Field

At least one example in accordance with the present invention relates generally to systems and methods for solving optimization problems and more specifically to systems and methods used to solve optimization problems that include complex logical relationships between binary variables, which assume only values 0 or 1.

2. Discussion of Related Art

Software packages that are capable of solving optimization problems are known. Optimization problems, which can be used to model the operations of particular physical systems, are usually expressed as terms of an "objective function" and a set of constraints that must be satisfied by a solution. Optimization problems may be formulated to achieve a variety of goals such as minimizing cost, maximizing throughput, or maximizing profit resulting from the provision of physical goods and services. Software packages designed to solve optimization problems use optimization engines, which are also known as solver engines, to determine a solution that maximizes or minimizes the value of the objective function subject to the set of constraints.

There is no single package or product that is able to solve every type of optimization problem. Solver engines differ in type, such as linear, integer, mixed, quadratic and nonlinear convex or nonlinear global, in the number of variables they can support, and in the solution techniques that they employ. One example of a solver engine is ILOG CPLEX which is available from ILOG Inc. of Sunnyvale, Calif. A few of the other solvers include: LINGO which is available from LINDO Systems, Inc. of Chicago Ill., Xpress-MP from Dash Optimization which has offices in the UK and in Engelwood Cliffs, N.J., and the free NEOS server from Argonne National Laboratory, which is operated by the University of Chicago.

These conventional optimization packages support linear constraints. A few specialized packages support both linear and non-linear mathematical constraints. However, logical constraints generally are not integrated into the optimization engine, but instead are enforced by routines outside of the optimization engine which repeatedly test logical constraints against candidate solution values in order to determine whether the logical constraints are satisfied.

Binary variables, which may assume a value of 0 or 1, are used in logical constraints to express the values true or false. The use of binary variables recently has been expanded. They have been introduced to general optimization problems as a way to solve problems whose choice of linear constraints depends on logical rules or relationships between problem variables. Some advanced packages enable an analyst to express these logical relationships in order to activate different sets of linear constraints depending on these relationships. For example, an analyst might indicate that at least one of the following constraints must be imposed.

$$2x1+x2+5x3<=100, 6x1-x2-39x3>=10, x7+18x1>=25$$

by associating a binary variable with each expression and stipulating that at least one of these variables must be 1 (true).

The CPLEX package has the capability to support simple logical conditions. CPLEX has a proprietary language that can be used to express logical relationships. Simple relationships are imposed on sets of linear constraints by adding new binary variables to the model and expressing the relationships as logical constraints upon these variables.

SUMMARY OF THE INVENTION

Aspects and embodiments in accordance with the present invention provide for systems and methods that overcome or alleviate some of the problems associated with solving optimization problems. For example, according some embodiments, optimization problems that include complex logical relationships between binary (true/false) variables can be submitted to one or more conventional optimization solvers without the development of customized software. The class of problems that can be solved using embodiments described herein is broad and includes, among others, choosing an optimal set of business projects or investments, choosing requirements to be implemented for a new software product release, managing working capital, choosing locations for manufacturing plants or warehouses, planning a production schedule, selecting truck routes, and scheduling airline crews or other workforces. Embodiments are applicable to many other real-world optimization problems that require both integer and decimal variables.

Embodiments are also applicable to solving general linear and non-linear optimization problems for which there are complex logical relationships between sets of linear constraints. Such a logical statement specifies the conditions under which particular sets of linear constraints should be activated.

Furthermore, embodiments also contribute to methods and systems for testing the validity of an electronic circuit design. A circuit design can be modeled as a logical expression. One way to test the design is to translate its logical expression to linear constraints and use a computer implemented tool to check whether these constraints are consistent. Some embodiments provide a method that automatically translates the logical model to linear constraints in a manner that contributes to efficient verification.

Many of these and other optimization problems are subject to logical constraints, and these sometimes reach a high level of complexity. Like other constraints, logical constraints limit the domain of the acceptable solution set—that is, the set of variable values that are valid solutions. This region of values is called the feasible region. The first step in an optimization process often comprises locating a point in the feasible region. Successive acts either find a direction in which the objective function is improving, or apply conditions that indicate that function values in some sub-region are worse, so that the sub-region can be cut away.

Embodiments described herein manifest an appreciation of the benefit of converting logical constraints into linear constraints that then become integral to the problem and limit the size of the feasible region. Using this technique, embodiments described herein avoid the repetitious logical testing found in conventional optimization packages. Moreover, by converting logical constraints into linear constraints, embodiments recognize and leverage the common ability of conventional packages to use linear constraints to express relationships between variables in a modeled system.

By supporting logical constraints through data input and mechanisms such as preprocessing and conversion to linear constraints rather than by using customized programming, embodiments make it possible to update the logical constraints at the data input level. This relieves the analyst of the need to update statements at the computer program or API level, and therefore dispenses with rewriting and sometimes, recompiling computer code. This is significant because it often is desirable to run many optimization scenarios across a range of parameter values, and, under a conventional approach, each scenario may require modification to and debugging of a family of programs. Furthermore, the analyst is not required to maintain documentation or track relationships between changed logical inputs and resulting outputs, and this decreases the likelihood of errors.

Furthermore, according to other embodiments, it is appreciated that often no individual optimization package can guarantee results that are optimal for all problems. Thus, some embodiments submit a problem to two or more optimizers, but without the need to code in multiple proprietary languages or APIs as would be required using conventional tools. As appropriate, embodiments may interface with solvers that support, among other methods, mixed integer programming (MIP), integer programming (IP) and/or binary integer programming (BIP) methods to find an optimal solution.

The method employed by some embodiments described herein that converts a logical constraint to linear constraints may require selected phrases (which are also termed subexpressions) in the logical statement to be replaced by binary auxiliary variables that are added to the problem. Increasing the number of problem variables may increase compute time. Hence it is important to keep the number of such variables as small as possible. Embodiments disclosed herein include processes that control and reduce the number of auxiliary variables.

At the same time, the presence of an extremely large number of linear constraints may, in some cases, impede solver execution. Thus some embodiments support control of a balance between numbers of linear constraints and numbers of auxiliary variables.

Various embodiments can also store problem data, linear constraints, and logical constraints (along with their linear translations) in a database. Some of these embodiments enable the storage and management of multiple alternate sets of problem input data that includes alternative sets of logical constraints. In addition, some embodiments can be integrated with a project management system, workforce assignment system, or logistics system, among others.

Embodiments may facilitate updating all parameters including, among others, business rules and other constraints. Embodiments disclosed herein may execute "what-if" scenarios to discover the effect of changes to cost, risk, value, new constraints, and/or changes to business rules, regulations and/or other concerns.

Embodiments may support convenient access to historical data so the current expectations of a program's outcome can be compared with earlier estimates. Historical information provides a tool that is useful when making new estimates, and also can uncover problems with an organization's current estimation techniques.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. The accompanying drawings are included to provide illustration and a further understanding of the various aspects and embodiments, and are incorporated in and constitute a part of this specification. The drawings are not intended to be drawn to scale. For purposes of clarity, not every component may be labeled in every drawing. The drawings, together with the remainder of the specification, serve to explain principles and operations of the described and claimed aspects and embodiments.

BRIEF DESCRIPTION OF DRAWINGS

The accompanying drawings are not intended to be drawn to scale. In the drawings, each identical or nearly identical component that is illustrated in various FIGs. is represented by a like numeral. For purposes of clarity, not every component may be labeled in every drawing. In the drawings.

DETAILED DESCRIPTION

Figure 1:
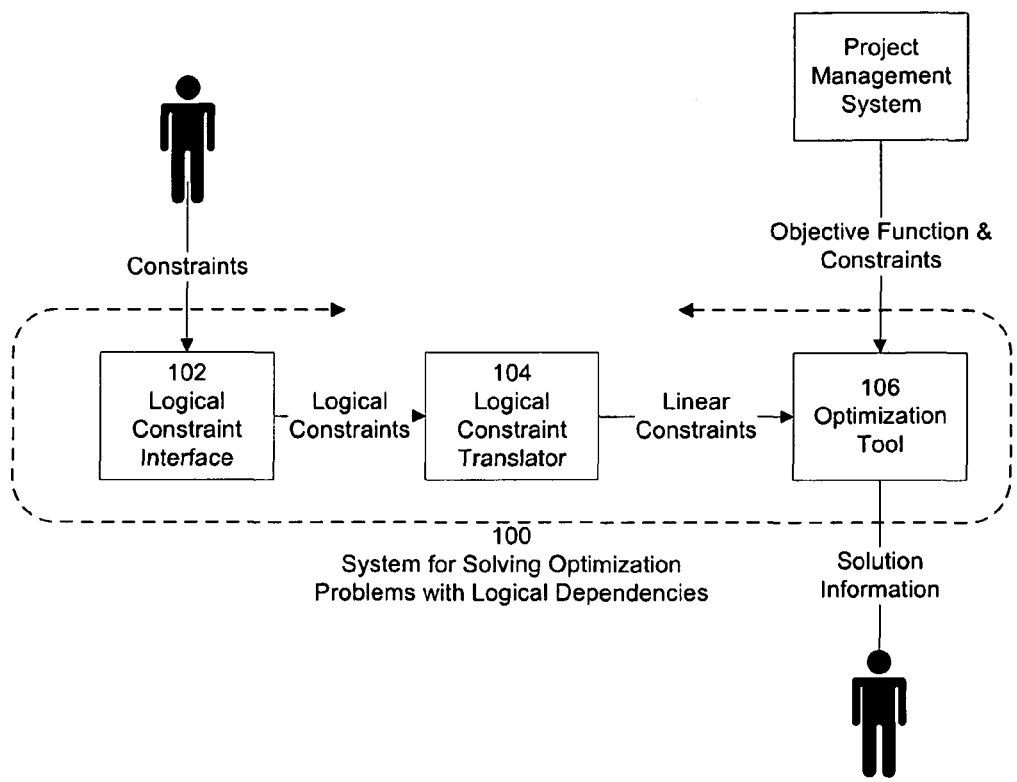
FIG. 1 depicts an environment in which embodiments in accordance with the present invention can be used.

At least some embodiments disclosed herein can preprocess logical constraints and translate them into a list of linear constraints. These embodiments can interoperate with conventional optimization packages because conventional optimization packages routinely accept linear constraints. Converting logical constraints to linear constraints, thus allows embodiments to combine the logical constraints and other constraints present into a single standardized set of constraints that can be submitted for immediate solution by any optimization package that supports integer variables.

Integrated processing of logical constraints in optimization problems is a significant technological advancement because large optimization problems, such as choosing the most profitable mix of projects from thousands of submissions, or selecting warehouse locations that minimize costs, typically are subject to many logical constraints. Some of these are simple, such as "if you are going to do project 17 or 18 you must do projects 6 and 7." Others can be very complex, involving many variables and logical clauses.

The aspects and embodiments disclosed herein in accordance with the present invention, are not limited in their application to the details of construction and the arrangement of components set forth in the following description or illustrated in the drawings. These aspects are capable of assuming other embodiments and of being practiced or of being carried out in various ways. Embodiments including specific implementations are provided herein for illustrative purposes only and are not intended to be limiting. In particular, acts, elements and features discussed in connection with any one or more embodiments are not intended to be excluded from a similar role in any other embodiments.

Optimization System

FIG. 1 illustrates a system 100 for solving optimization problems with logical dependencies according to one embodiment. As shown, this system forms part of a project management and/or business activity system and has the function of selecting a set of projects (and/or activities) that is currently optimal, according to a value metric. The chief variables xi are binary, with xi=1 if a project is selected and xi=0 otherwise.

Any of the recited modules may be implemented in customized software code and/or using existing software including a GUI, email, FTP, batch system interface, database system data movement tools, middleware, any combination thereof, or otherwise.

Moreover, the modular structure and content recited below is for exemplary purposes only and is not intended to limit the invention to the specific structure shown in FIG. 1. As will be apparent to one of ordinary skill in the art, many variant modular structures can be architected without deviating from the present invention. The particular modular arrangement presented in FIG. 1 was chosen to promote clarity.

As shown, system 100 includes a logical constraint interface 102, a logical constraint translator 104 and an optimization tool 106. The logical constraint interface 102, elements of which are described in further detail below, receives logical constraints and other information from various sources, including external entities such as users and other systems, and provides that information to the logical constraint translator 104. The logical constraint translator 104 receives logical constraint information from the logical constraint interface 102 and provides linear constraint information to the optimization tool 106. The optimization tool 106 receives linear constraints from the logical constraint translator 104 and one or more objective functions and additional linear constraints from an external entity and provides solution information to an external entity. Information may flow between these modules using any technique known in the art. Such techniques include passing the information over a network via TCP/IP, passing the information between modules in memory and passing the information by writing to a file, database, and/or some other non-volatile storage device.

The logical constraint interface 102 exposes interfaces that receive and provide logical constraint information. The logical constraint interface 102 may include user interfaces such as those described below. The logical constraint interface 102 may both restrict input to a predefined information domain and validate any information entered prior to using the information and/or supplying the information to other system components. Thus, according to some embodiments, analysts use a user interface, such as the logical constraint interface 102, to enter logical constraints relating to an application, and this interface may determine whether each of these constraints is logically valid. In the depicted embodiment, the application may be the selection of a mix of projects that provides maximal return subject to constraints such as a budget allowance and complex project dependencies.

The logical constraint translator 104 converts logical constraints to linear constraints. In some embodiments, this translation is accomplished using at least a portion of the translation processes discussed below. The logical constraint translator 104 then provides the newly generated linear constraints to the optimization tool 106.

The optimization tool 106 exposes interfaces that accept objective function and linear constraint information and supply solution information. In the embodiment shown, the optimization tool 106 generates a solution based on the combined input of the logical constraint translator 104 and the external project management system. The optimization tool 106 then presents the solution to a user. In another embodiment, optimization tool 106 supplies linear constraint information to other optimization packages for further processing.

In at least one alternative embodiment, a module may be added to the project management system that allows it to accept the linear constraints that are output by the logical constraint translator and combine them with the project data.

According to some embodiments, the system 100 may include one or more computer systems, such as the general purpose computer system discussed below with regard to FIG. 12. These computer systems may have one or more processors or controllers, memory and interface devices. Some examples of computer systems include, among others, network appliances, personal computers, workstations, mainframes, networked clients, servers, media servers, application servers, database servers and web servers. Other examples of computer systems may include mobile computing devices, such as cellular phones and personal digital assistants, and network equipment, such as load balancers, routers and switches.

In some embodiments, the general purpose computer systems are specially and specifically configured to perform any of the processes and acts disclosed herein. In other embodiments, system 100 comprises a special purpose computer with specialized hardware and software that is configured to perform any of, or a subset of, the processes and acts disclosed herein. The particular configuration of system 100 depicted in FIG. 1 is used for illustration purposes only and embodiments of the invention may be practiced in other contexts.

Further, embodiments may be implemented using software, hardware or firmware, or any combination thereof. Thus, embodiments in accord with the present invention may be implemented within processes, acts, systems, system elements and components using a variety of hardware and software configurations, and the invention is not limited to any particular distributed architecture, network, communication protocol, number of users or systems. For example, a translation implementation may be placed on a chip in a device that performs translations for a network of computers.

The following section discloses how embodiments can translate a logical expression to a set of linear constraints that subsequently can be submitted to an integer programming (IP), mixed integer programming (MIP), or more general optimization solver. The efficiency of embodiments using this technique may be very sensitive to the number of problem variables and fairly sensitive to the number of constraints. At least one embodiment combines direct translations of logical expressions, Boolean algebraic transformations of expressions, and substitutions for phrases within an expression by auxiliary variables; these are applied in a manner designed to decrease the burden on the solution engine.

Boolean Algebra Notation

Logical constraints popularly are expressed in two ways: as direct assertions, such as Expression A is TRUE
(NOT Expression A) is TRUE or as implications such as IF Expression A THEN Expression B.

A direct assertion is the most general logical constraint because

IF Expression A THEN Expression B is equivalent to the negated assertion (NOT Expression A) OR Expression B is TRUE.

Logical expressions can be written symbolically, manipulated, and evaluated using Boolean algebra, which was developed by George Boole in the late 1830s. Several equivalent notations have been defined for Boolean algebra. This disclosure uses "+" for OR, "*" for AND, postfix ' for NOT, and parentheses for grouping. The symbols "(",")", "+", "*", and postfix ' will be called operators. The value TRUE is represented by 1 and FALSE is represented by 0. Implications can be written using an arrow, A→B.

Since Boolean variables take on only the values 0 and 1, they are called 0/1 variables or binary variables. In order to implement some embodiments disclosed herein, it is helpful to label 0/1 variables in a naming family. Thus, herein the family $x1, x2, \ldots$ is used for problem variables and a second naming family, $w1, w2 \ldots$ is used for auxiliary variables.

The expression $x1$ OR $x2$ is represented as $x1+x2$, and is called a sum. Values of this expression are computed using the formulas:

$$1+0=0+1=1+1=1=\text{TRUE, and } 0+0=0=\text{FALSE}.$$

The statement $x1$ OR $x2$ is TRUE thus is written as $x1+x2=1$.

The expression $x1$ AND $x2$ is represented as $x1*x2$ and is called a product. Values of this expression are computed using the formulas:

$$1*0=0*1=0*0=0=\text{FALSE, and } 1*1=1=\text{TRUE}.$$

The statement $x1$ AND $x2$ is TRUE thus is written $x1*x2=1$.

The statement NOT $x1$ is represented as $x1'$ and $x1'$ is called a negated variable.

Values of $x1'$ are computed using $$1'=0=\text{False}, 0'=1=\text{True}.$$

Note also that $$x''=x, x+x'=1$$

$$X*x'=0, x+x=x, x*x=x$$

$$1+x=1 \text{ and } 0*x=0.$$

Using this notation, every logical expression used herein is composed of variables and the following symbols: +* ( )'. A logical constraint that has the form: If A then B is TRUE is equivalent to the assertion $$A'+B=1.$$

Laws for Boolean Algebra

De Morgan's Laws for Boolean algebra state the following relationships between sums and products:

$$(x1+x2+\ldots+xn)'=x1'*x2'*\ldots*xn'$$

$$(x1*x2*\ldots*xn)'=x1'+x2'+\ldots+xn'.$$

Two distributive laws hold for Boolean Algebra. The first is identical to the distributive law for ordinary algebra:

$$x*(y1+y2)=x*y1+x*y2.$$

This law holds for any number of y summands:

$$x*(y1+\ldots+yn)=x*y1+\ldots+x*yn.$$

The second distributive law is contrary to ordinary algebra:

$$x+y1*y2=(x+y1)*(x+y2).$$

The law holds for any number of y factors:

$$x+y1*\ldots*yn=(x+y1)*\ldots*(x+yn).$$

Factorization

An assertion of the following form (Expression 1)*(Expression 2)* ... *(Expression k) is TRUE is equivalent to k separate assertions:

Expression 1 is TRUE

...

Expression k is TRUE.

For example, $$(x1+x2'+x5)*(x2+x10+x33) \text{ is TRUE}$$

is equivalent to the two separate assertions:

$$x1+x2'+x5 \text{ is TRUE}$$

$$x2+x10+x33 \text{ is TRUE}.$$

Factoring a product of expressions breaks a complicated expression into simpler ones and simplifies the process of translation to linear constraints.

Note that a sum sometimes can be changed to a product that can be factored by means of the second Boolean distributive law. Suppose that E and $F1, \ldots, Fn$ are logical expressions. Then $$E+(F1*\ldots*Fn)=(E+F)\ldots*(E+Fn).$$

Using factorization, the assertion is equivalent to $$E+Fi \text{ is TRUE}, i=1, \ldots, n.$$

This technique may be exploited by embodiments in accordance with the present invention where it would be an efficient way to proceed. For example, this technique promotes efficiency when processing certain deeply nested expressions such as:

$$x1 + x2*(y1 + y2*(z1 + z2*(u1 + u2))) =$$
$$x1 + x2*(y1 + y2*(z1 + z2)*(z1 + u1 + u2)) =$$
$$x1 + x2*(y1 + y2)*(y1 + z1 + z2)*(y1 + z1 + u1 + u2) = (x1 + x2)*$$
$$(x1 + y1 + y2)*(x1 + y1 + z1 + z2)*(x1 + y1 + z1 + u1 + u2)$$

because the final expression translates to four simple linear constraints.

The technique is generally not useful when some factors are complex expressions that include many or large product phrases. Its use may be based on applying a threshold to the number of linear constraints that will result from the application of the distributive law.

Definitions for Logical Expressions

The following special definitions are introduced in order to simplify the description of some embodiments.

Definition 1 (Level): The level of a parenthesis in a logical expression is 1 if no parentheses enclose it. Otherwise, it is 1+ the level of the parentheses that enclose it. The level of any other symbol in an expression is 0 if no parentheses enclose it, and otherwise is the level of its enclosing parentheses.

Definition 2 (Depth): The depth of an expression is the maximum level of the matching pairs of parentheses in the expression.

Definition 3 (Term): A term is a variable or the negation of a variable.

Definition 4 (Simple Sum): A simple sum is the logical OR of a set of terms, such as $x1+x2+x3'+x4+x5'$.

Definition 5 (Simple Product): A simple product is the logical AND of a set of terms, such as $x1'*x2*x3'*x4'*x5$.

The complement of a simple sum is a simple product and the complement of a simple product is a simple sum.

Definition 6 (Sum-with-products): A sum-with-products is a sum in which each addend is an individual term or a simple product, at least one addend is a simple product, and there are at least two addends. For example, $x1+x2+x3'*x4+x5*x6'*x7*x8$ is a sum-with-products. Its complement is $x1'*x2'*(x3+x4')*(x5'+x6+x7'+x8')$.

Definition 7 (Product-of-sums): A product-of-sums is a product of terms and simple sums with at least two factors for which at least one factor is a simple sum. For example, $x1*x2*x3'*(x4+x5)*(x6'+x7+x8)$ is a product-of-sums. Its complement is $x1'+x2'+x3+x4'*x5'+x6*x7'*x8'$.

The complement of a product-of-sums is a sum-with-products. The complement of a sum-with-products is a product-of-sums.

Definition 8 (Leaf): L is a leaf phrase in expression E if L has depth 1 and is surrounded by parentheses in E. Leaves may be replaced by auxiliary variables.

Definition 9 (Depth 1 Product): A depth 1 product is a phrase of depth 1 that is a product of at least two factors and contains no unnecessary parentheses. Since the product has depth 1, at least one factor is a sum of variables and/or products.

Definition 10 (Nested expression): A nested expression is an expression that contains parentheses at depth at least two.

Table 1 displays the complement relationships for some basic phrases.

TABLE 1

Complements of Depth 0 Phrases

| Phrase | Complement |
|---|---|
| Simple sum | Simple product |
| Simple product | Simple sum |
| Sum-with-products | Product-of-sums |
| Product-of-sums | Sum-with-products |

Note that if C is a product $A1* \ldots *An$, then its complement has depth 1 since each factor Ai is an individual term, a simple sum, or a sum-with-products and $C'=A1'+ \ldots +An'$.

If C is a sum such as $x1+ \ldots +xn+B1+ \ldots +Bm$, where each Bi is a depth 1 product but no Bi includes a factor that is a sum-with-products, then C' also has depth 1.

If C is a sum and some addend Bi is a product that includes a factor that is a sum-with-products, then Bi' is a sum with depth 1 that has to be surrounded by parentheses in C', making C' a depth 2 expression. For example, if $C=x1+x2*(x3+x4*x5)$, then $C'=x1'*(x2'+x3'*(x4'+x5'))$, which has depth 2.

Ordering Expressions

Some embodiments described herein replace leaf phrases and (optionally) selected simple products with auxiliary variables. One way to minimize the number of auxiliary variables added to a problem is to reuse an auxiliary variable every time its phrase appears in any logical constraint associated with a problem. Whenever a phrase in some expression is replaced by an auxiliary variable, identical phrases may be replaced by the same auxiliary variable in all of the expressions associated with the problem.

Reuse may be extended across multiple expressions by maintaining two lists on a computer-readable storage medium. One is a list of simple products and their auxiliary variables and the other contains leaf phrases and expressions of depth<=1 and their auxiliary variables. According to some embodiments, a list may be searched before a phrase is replaced, and if a match is found, the matching auxiliary variable is used for the replacement. Alternatively, whenever a new auxiliary variable is defined, it may immediately be inserted into all of the expressions in which the corresponding product or leaf appears. Or, lists of phrases and auxiliary variables may be accumulated and a wholesale replacement may be made into all expressions at suitable points in the process or at the end of the process. The latter has the advantage that repetitions of phrases may be deleted from the list, making it unnecessary to search and match.

Providing a unique representation for each phrase expedites the search-and-match or phrase deletion process. According to various embodiments, there are many ways to define a unique representation. At least one embodiment defines a unique ordering of variables, simple sums, simple products, depth 1 products and depth 1 phrases. An example of one such embodiment is described below. This embodiment makes it possible to search and match using string comparison.

For convenience, identifiers xi will be reserved for problem variables and wj for auxiliary variables. This embodiment orders the x and w variables as follows:

$$\text{if } i<j, \text{ then } xi<xj \text{ and } wi<wj$$

$$xi<xi' \text{ and } wi<wi'$$

for all i, j any xi or xi' is less than any wj or wj'.

Ordering Simple Sums and Simple Products: For this embodiment, any sum or product of x-terms and w-terms can be expressed in a unique order by placing all ordered x-terms first followed by all ordered w-terms. For example, $$x9+x7'+w4+x8=x7'+x8+x9+w4,$$

$$x9*x7'*w4*x8=x7'*x8*x9*w4$$

Writing a sum in order makes it easy for this embodiment to detect a pair such as $x2+x2'$, which equals 1. A sum that includes a variable and its negation is equal to 1 and should be replaced by 1. Writing a product in order makes it easy for this embodiment to detect a pair such as $x2*x2'$, which equals 0. Any product that includes a variable and its negation is equal to 0 and should be replaced by 0.

Comparing Sums: This embodiment orders simple sums lexicographically, namely $$\text{if } S1=u1+ \ldots \text{ and } S2=v1+ \ldots \text{ and } u1<v1, \text{ then } S1<S2,$$

$$\text{if S is a simple sum, } S1=S+u \ldots \text{ and } S2=S+v \ldots \text{ and } u<v, \text{ then } S1<S2,$$

$$\text{if S is a simple sum and } S1=S \text{ and } S2=S+var(s), \text{ then } S1<S2.$$

Comparing Products: This embodiment also orders simple products lexicographically, namely $$\text{if } P1=u1* \ldots \text{ and } P2=v1* \ldots \text{ and } u1<v1, \text{ then } P1<P2,$$

if P is a simple product, $P1=P*u \ldots$ and $P2=P*v \ldots$ and $u<v$, then $P1<P2$, if P is a simple product and $P1=P$ and $P2=P*var(s)$, then $P1<P2$.

For example, $$x3*x1'*w10'+x1*x6*x7' = x1*x6*x7'+x1'*x3*w10'$$

This embodiment specifies that any term or simple sum is less than any simple product. Hence, for any depth 0 phrase, the ordered sum of its terms is placed before its ordered products.

For this embodiment, a set of depth 0 phrases is ordered by first comparing their ordered terms, and if they are equal, comparing their products. For example, since $xi<x1*x2$, $$x3+x7'+x4*x5 < x4'+x6+x7 < x1*x2.$$

This embodiment specifies that any depth 0 phrase is less than any depth 1 product. To order the factors in a depth 1 product, this embodiment gathers the factors that are individual terms into one simple product and places it first. Each remaining factor has a depth 0 phrase surrounded by parentheses. This embodiment orders the remaining factors according to the order of their included depth 0 phrases. A sum of depth 1 products can be ordered by comparing the factors in each ordered product. For example, $$(x3+x5)*(x4+x6) < (x3+x5)*(x4+x1*x6)$$

Finally, to compare two ordered depth 1 phrases, this embodiment compares their depth 0 phrases, and if these are equal, compares their ordered products.

Method for Translating Logical Constraints to Linear Constraints

Embodiments in accordance with the present invention preprocess each logical expression, simplifying it by means of a variety of logical equivalences. Some embodiments substitute auxiliary variables for selected phrases, after which the resulting expressions are re-simplified. According to these embodiments, the process is repeated until all expressions have depth<=1. An expression with depth<=1 can be directly translated to linear constraints using a fundamental direct translation formula.

Preprocessing a List of Logical Expressions

For the purpose of this exposition, let EX[1] represent the list of logical constraint expressions associated with a problem. Embodiments apply an appropriate simplification procedure to the EX[1] that reduces the number of linear constraints and the number of auxiliary variables that are generated while translating the expression to linear constraints. The output of the simplification process is a list of simplified logical constraints SX[1], an ordered list of leaves and depth 1 simplified expressions, LX[1]. A process like the following produces the desired output. There are many equivalent variations of the procedure, based on the order in which various actions are performed.

At least one embodiment includes a preprocessor that performs substitutions based on Boolean identities: $u''=u$, $u+u=u$, $u*u=u$, $u+u'=1$, and $u*u'=0$. Processing an ordered expression whose depth is 0 is complete after ordering the expression and making these substitutions.

In general, preprocessing may alter an expression. Its depth may change and the expression may be broken into smaller factor expressions. In some embodiments, extraneous parentheses and complements are stripped away and the underlying grammatical structure of the expression is identified and recorded. Outputs created by the preprocessor include simplified expressions and an ordered list of ordered leaves.

Actions in accordance with this process that may be taken by specific embodiments include:

R0. Remove the next expression from the input list.
R1. Order simple sums and simple products, and make substitutions based on the Boolean identities.
R2. Perform an initial parse: locate and record the positions of each matching pair of parentheses.
R3. Record the position of each left parenthesis and the type of the operator, (, +, or *, that precedes it. For convenience, the fact that a parenthesis is located at the start of an expression can be denoted by means of a dummy symbol such as "@". Record the position of each right parenthesis and the type of operator,), +, *, or ', that follows the right parenthesis or a parenthesis-and-complement combination. The fact that a parenthesis or ' is at the end of an expression can be denoted by the same dummy symbol.
R4. Verify that the expression is well-formed.

The next steps simplify the expression.

N1. Expand each complemented sub-expression whose depth is <=1 and whose complement also has depth <=1.
N2. Remove all unnecessary parentheses. A process for removing unnecessary parentheses is discussed further below. Among other things, removing unnecessary parentheses consolidates phrases. For example, $$x1*x2*(x2'*x3)*((x4+x5)*(x6+x7*x8))* = \\ x1*x2*x2'*x3*(x4+x5)*(x6+x7*x8)$$

N3. If the expression has changed, repeat, starting from R1.
D1. Record the level number (depth) of each parenthesis.
D2. Record the level number of every variable and every +, *, and ' symbol, which is the depth of their enclosing parentheses.
D3. Determine whether the expression can be factored. An expression can be factored if it has no + symbols at level 0 and at least one * symbol at level 0. The number of factors equals 1+(number of * symbols at level 0). Append the factors to the expression input list for reprocessing and return to step R0.
D4. If the expression has the form (E)', where E is a product of two or more factors, $A1* \ldots *An$, rewrite $(A1* \ldots *An)'$ as the sum $A1'+ \ldots +An'$, and append the sum to the input list for reprocessing.
D5. If the expression has depth <=1, add it to the list LX.
D6. If the depth of the expression is >=2, add the expression to the output list of simplified expressions, SX. At this point an expression with depth>=2 will either be a sum of two or more sub-expressions, or, will be the complement of a sum of two or more expressions such that the expanded complement would have depth>=2.

Figure 2:
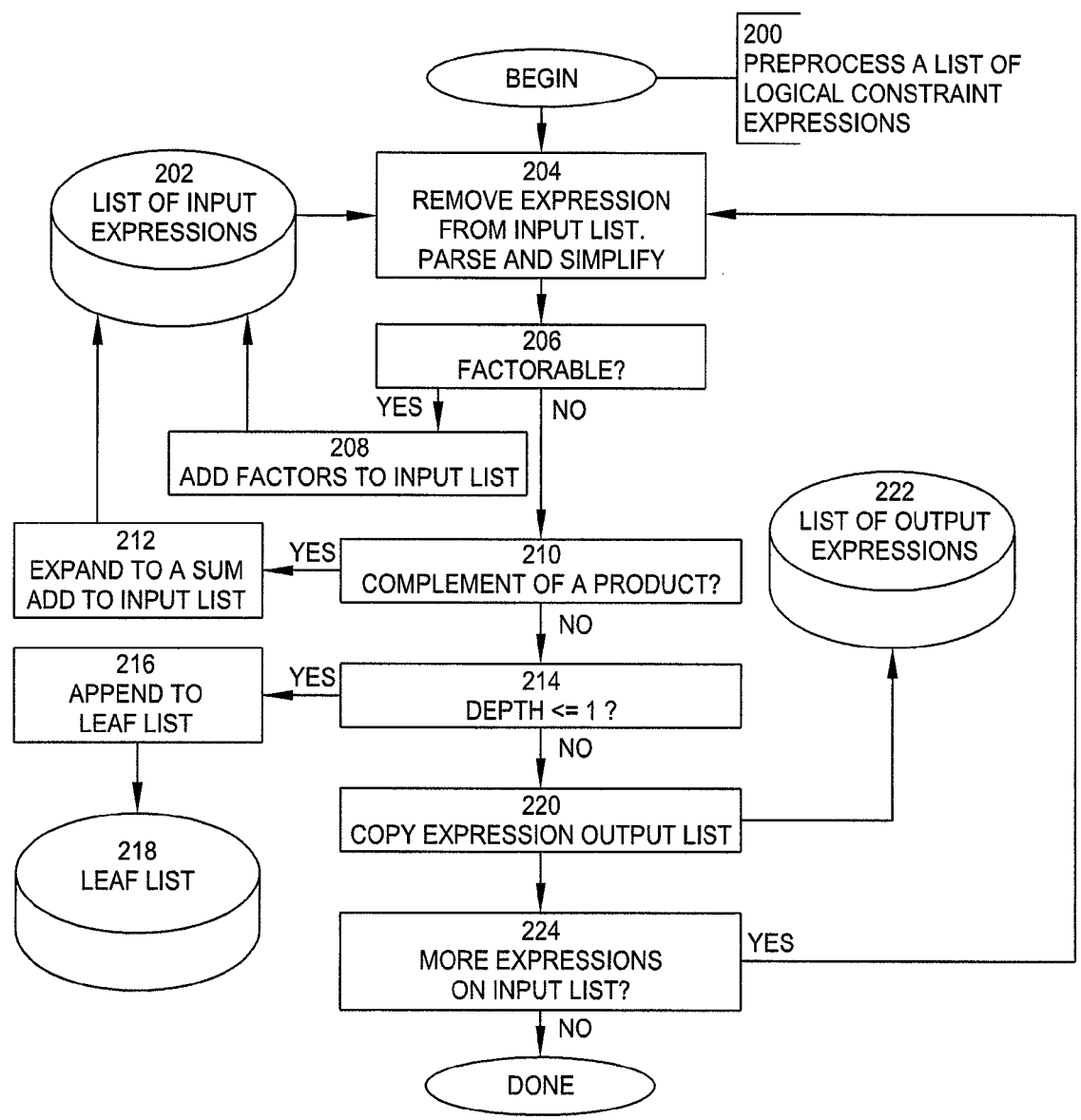
FIG. 2 illustrates an example process for preprocessing a logical expression in accordance with an embodiment.

FIG. 2 provides an illustration of a particular embodiment, process 200, in which a list of logical constraint expressions is preprocessed and simplified. A list of input logical expressions is stored on computer-readable storage media 202. In 204, an expression is removed from the list. Simple sums and products are ordered, making it possible to use Boolean identities to simplify phrases via substitution.

The parsing process verifies that the expression is well-formed. Expanding complemented phrases whose complements have depth less than 1 and removing unnecessary parentheses reduces the complexity of the expression. Assigning a level to each variable and symbol makes it possible, in 206, to determine whether the expression is a product of factors. If so, in 208, the individual factors are added to the input list 202 for reprocessing.

In 210, parsing makes it possible to detect whether the expression is the complement of a product of factors. If so, in 212, the complement is expanded to a sum of terms and added to the input list 202 for reprocessing.

When 214 is reached, simplification of the expression is complete. If the expression has depth<=1, it is ordered and, in 216, added to the leaf list 218. Otherwise, the expression has depth>=2, and in 220, a copy of the simplified expression is added to the output list 222. If at 224, expressions still remain on the input list, the process cycles back to 204 and repeats until the input list is empty.

Balancing Linear Constraints and Auxiliary Variables

Some summands may include simple products with many factors. Sums of simple products with many factors can lead to very large numbers of linear constraints. According to some embodiments, the number of linear constraints can be controlled by setting a configurable threshold M that causes simple products and products of sums that have >M factors to be replaced with auxiliary variables. (However, if the number of summands in any sum is >M, it should be omitted from the product that is replaced.)

Other embodiments provide an analyst with a user interface that allows specific products to be selected for replacement by clicking them. According to additional embodiments, a computer-based procedure is used to check whether the total number of linear constraints generated to translate an expression would exceed a configured threshold, and if so, to replace products including the largest numbers of factors with auxiliary variables until the threshold is satisfied. Other tools for determining a list of products for replacement with auxiliary variables may be used and the scope of the present invention is not limited to these particular examples.

Some embodiments perform the following process for product substitution when a threshold M is used. Other embodiments use variations of this process that are based on a list of products generated by other criterion, such as the various selection criteria discussed above.

Definition (Big-product) A big-product is a simple product or a product-of-sums such that the number of its factors exceeds a given threshold.

If a product threshold M has been set, embodiments using the following procedure generate an ordered array PX that consists of ordered big-products and a corresponding array PAUX of auxiliary variables.

Actions in accordance with this process that may be taken by specific embodiments include:
  P0. Copy the next simplified expression from the input list.
  P1. Search for the next product that has >M factors. Order the product and add the ordered product to a product list. Repeat until the whole expression has been searched.
  P2. Repeat, starting from P0, until all expressions have been processed.
  P3. Order the list of products and remove repeats to obtain PX.
  P4. Assign an auxiliary variable to each product, creating the array PAUX.

Figure 3:
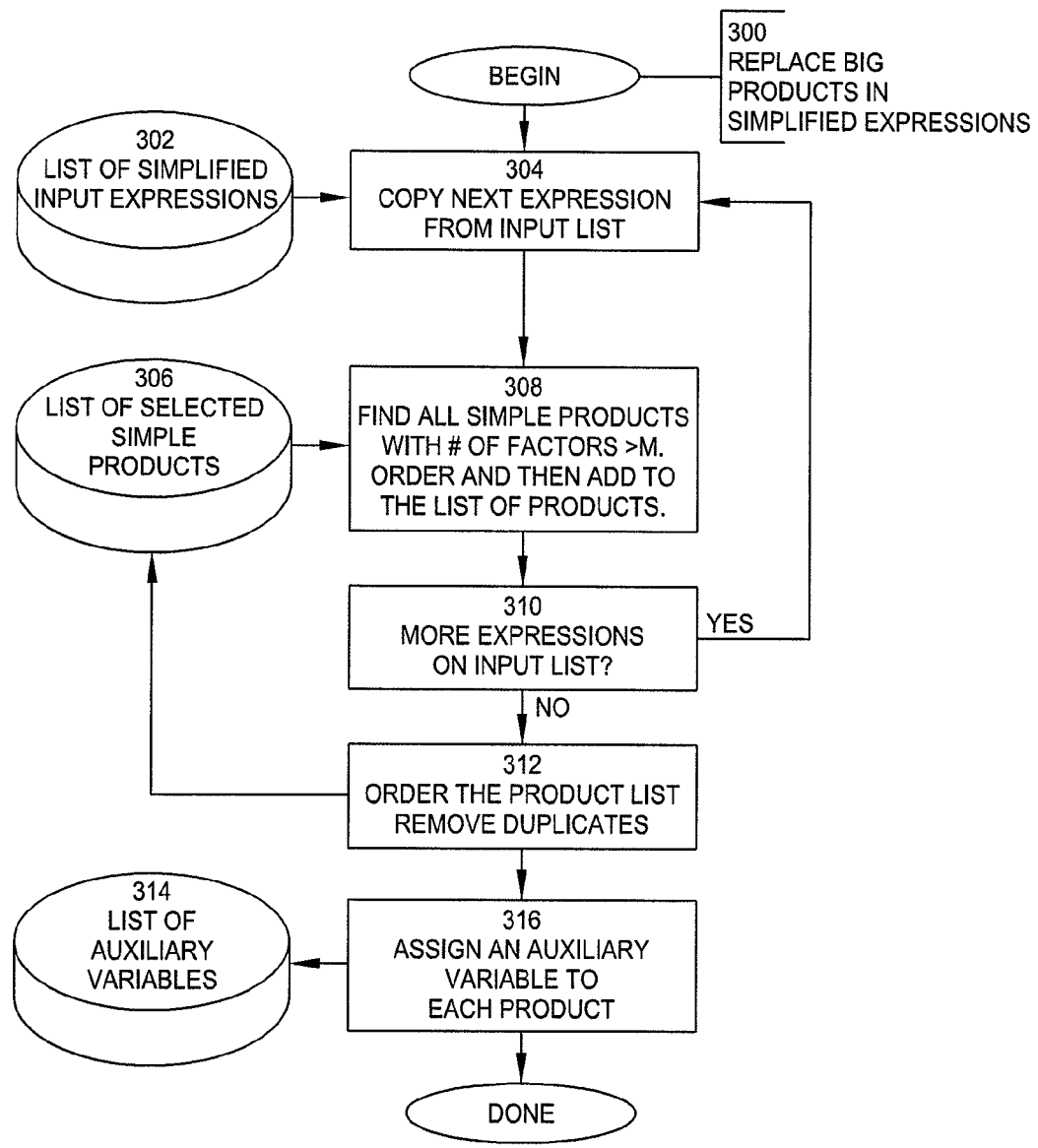
FIG. 3 shows an example process for replacing selected AND statements with auxiliary variables according to an embodiment.

FIG. 3 provides an illustration of a particular embodiment, process 300, which is used when selected products need to be replaced in order to control the number of linear constraints that are generated.

The input for this process is the list of simplified input expressions stored in computer-readable storage media 302.

In 304, the first/next expression is copied from the input list. All simple products that satisfy the substitution criteria are extracted, ordered and placed on the list of selected products.

In 310, if there are more unprocessed expressions, the procedure returns to 304 to copy the next one.

In 312, after all of the expressions have been processed, the product list is ordered and duplicates are removed.

In 316 an auxiliary variable is assigned to each distinct product and added to the list on 314.

Embodiments may add steps to this to this procedure that generate the linear constraints to make each auxiliary variable equivalent to its big-product, and append them to LINEAR.

Embodiments may generate these linear constraints at any convenient time. Waiting until duplicates have been removed from PX avoids redundant constraints. For some embodiments, it may be convenient to wait longer, until all processing of the simplified expressions has been completed.

Iteratively Processing a List of Simplified Logical Expressions

In some embodiments, the final processing of simplified logical expressions includes acts that reduce the depth of each expression. The acts are repeated until the depth is <=1. According to some embodiments, during execution of the process, the following lists are maintained on a computer-readable storage medium: a list of simplified logical expressions for the current iteration; a list of ordered leaves and their corresponding auxiliary variables; if a big-product selection has been defined, a list of products and their corresponding auxiliary variables. In some embodiments, a list of linear constraints may have been generated to make each auxiliary variable that has been defined up to this point equivalent to its phrase. Other embodiments may build the constraint list subsequently.

If no product threshold has been set, embodiments start with SX[1]=the original list of simplified expressions.

Some embodiments use the following process to generate: an ordered array LX[1] that includes the ordered leaves and final constraints of depth<=1; an array LAUX[1] that lists the corresponding auxiliary variables. In addition, the process outputs the list of the linear constraints, LINEAR, required to make each auxiliary variable equivalent to its leaf. Acts in accordance with this process that may be taken by specific embodiments include:
  D1. If the current simplified expression has depth<=1, order the expression, add it to list LX[1], and delete it from SX[1].
  D2. If the current simplified expression has depth >=2, extract its leaf phrases, that is, the phrases between each matching pair of parentheses that contain a depth 1 phrase.
  D3. Order each leaf phrase, and append it to LX[1].
  D3. Repeat until all simplified logical constraints have been processed.
  D4. Order LX[1].
  D5. Remove duplicates.
  D6. Append LX[1] to list LX.

According to some embodiments, the process will be iterated, defining lists SX[i], LX[i], and LAUX[i] until all expressions have been reduced to depth<=1. The process also creates a global array that contains all leaves LX that and their corresponding auxiliary variables LAUX that will arise from all iterations of the process. Since the process is iterated, the acts that follow describe how to go from i to i+1.
  L1. Assign a new auxiliary variable to each leaf in LX[i] and append it to the list LAUX[i].
  L2. Replace the leaves in the expressions SX[i] with their corresponding auxiliary variables and call the resulting set of expressions SXT[i].
  L3. Perform the preprocessing process on SXT[i] to obtain SX[i+1], and perform all acts starting from D1 to create LX[i+1] and enlarge LX.

The effect of these acts is to reduce the depth of any expression whose depth is greater than two by at least two.

L4. Repeat the process until the depth of every logical constraint has been removed from the list.

According to some embodiments, all of the linear constraints that cause each auxiliary variable in LAUX to be equivalent with its corresponding phrase in LX may be generated at this point. One advantage of doing so at the end of the process is that the operations could be offloaded to an external processor.

Figure 4:
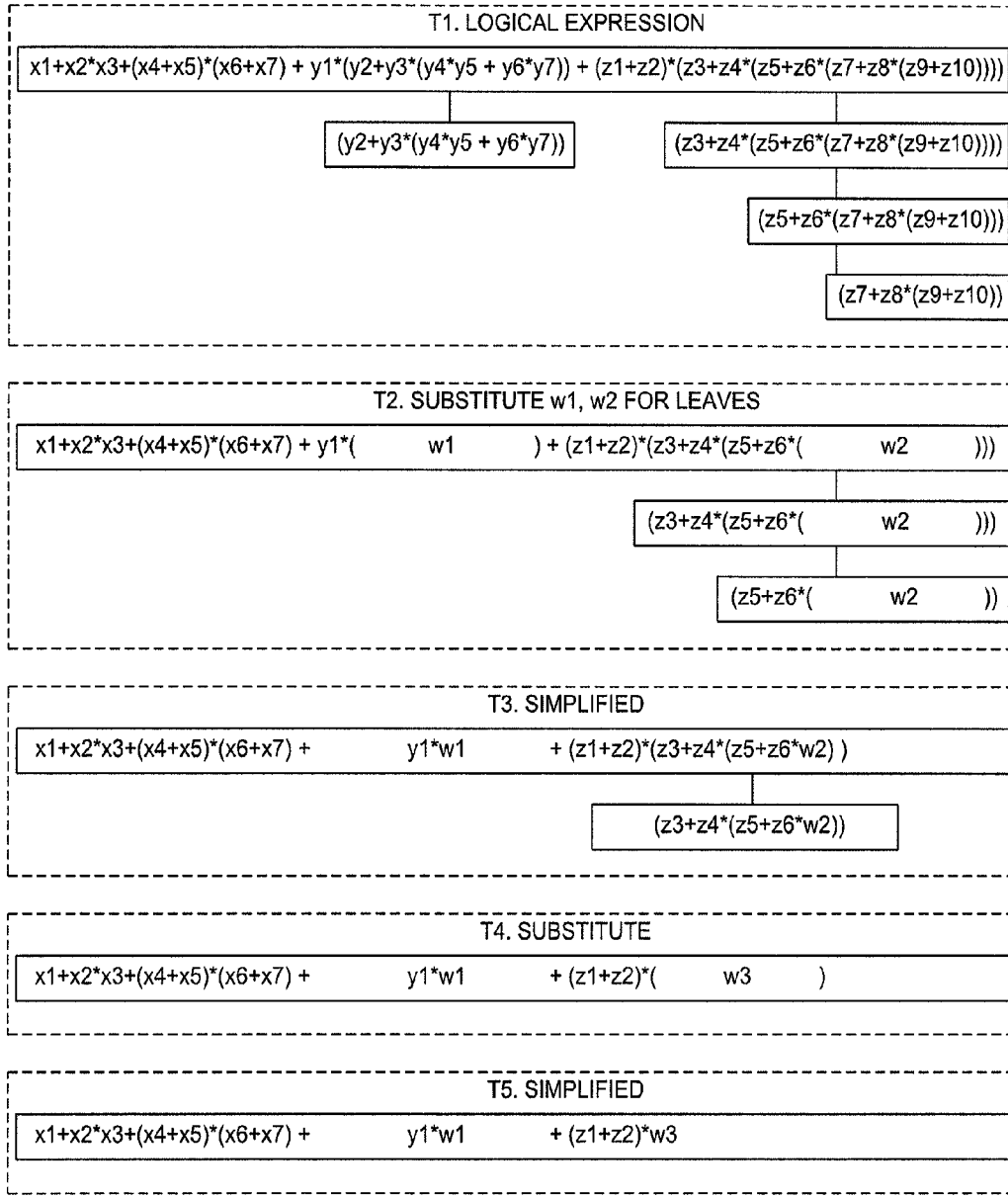
FIG. 4 depicts acts used to transform and translate a logical expression according to an embodiment.

FIG. 4 presents an example that illustrates, for one particular expression, the iterative process of substitution by replacing leaves by auxiliary variables. No products were replaced in this example. The logical expression is a sum of phrases. In T1, the structure of the logical expression is displayed as a tree representation. The rules for forming the tree are: a. each summand that has depth>=2 has one or more child nodes; b. a child node is an expression in parentheses that has depth >=1; and c. the leaves of the tree are depth 1 expressions that appear in the expression surrounded by parentheses. In the example, the second and third summands each have one child node. The leaves of the tree are y2+y3*(y4*y5+y6*y7) and z7+z8*(z9+z10).

In T2, auxiliary variables w1 and w2 are substituted for the two leaves, and then are substituted for the leaf expressions throughout the tree. After the substitutions in T2 of FIG. 4, in T3, the expressions are simplified to remove of the extraneous parenthesis and consolidate products. z5+z5*w2 no longer is a leaf so its leaf node is removed from the tree. Only one leaf remains on the tree. In T4, w3 is substituted for the remaining leaf. Finally, in T5, the resulting expression is simplified, and the entire expression now has depth 1. Depth 1 expressions can be directly translated to linear constraints.

If a product threshold has been set, some embodiments proceed in pairs of iterative acts. The first act replaces products with auxiliary variables. The second act is like the preceding, replacing leaves with auxiliary variables.

These embodiments start with SX[1]=the initial list of simplified expressions and PX[1]=the initial ordered list of products. In these embodiments, the following process generates an ordered array that includes of the ordered products PX[1] and corresponding auxiliary variables PAUX[1]. In some embodiments, the process is iterated, defining lists SX[i], PX[i], PAUX[i], LX[i], and LAUX[i] until all expressions have been reduced to depth <=1. Since the process is iterated, the acts that follow describe how to go from i to i+1.

PP1. Create a new list SXT[i] by substituting a big-product's auxiliary variable for each big-product in each expression. Note that a substitution may cause the structure and depth of a sub-expression to change.

PP2. Preprocess SXT[i] to obtain SX[i+1], and the list of ordered leaves and expressions LX[i+1].

PP3. Perform acts L1 to L3.

PP4. Repeat, starting at PP1 until the depth of every logical constraint has been reduced to at most 1, and all expressions have been removed from the list.

Thus embodiments in accordance with the present invention include systems and processes that reduce complex logical expressions to a state in which they may be converted to linear constraints using a set of fundamental direct translations.

Fundamental Direct Translations

This section discloses embodiments that include processes for directly translating simplified logical expressions that have depth <=1 to linear constraints. The building blocks of a simplified expression of depth 0 are individual terms and simple products. The building blocks of an expression of depth 1 are simple sums, sums of products, and depth 1 products. A depth 1 product includes at least one factor that is a depth 0 sum and may include factors that are individual terms.

Translation formulas for sample expressions are presented in the tables that follow and are written using identifiers other than xi and wj. The use of a variety of other identifiers makes the translations easier to read and understand. In at least one embodiment, these translations are performed after the processes described above have successfully reduced all logical constraints to a depth <=1. In addition, some embodiments include data structures specifically configured to efficiently store these translations.

In some situations an expression can be translated via several alternative formulas that are logically equivalent. There also are many alternatives that are algebraically equivalent. Some embodiments in accord with the present invention evaluate these alternative ways to express linear constraints in order to speed up execution. For example, it is possible that using a large number of very simple constraints such as yj>=zi rather than fewer, but more complicated constraints may speed up execution time. In general, an optimum choice may depend on the internals of the optimization package.

Table 2 presents translations for variables, simple sums and simple products. To promote readability, no negated variables appear in the formulas in the table.

TABLE 2

| Translations of Variables, Simple Sums, and Simple Products | |
|---|---|
| Variable | y is TRUE, y' is TRUE |
| Linear Constraint | y = 1, y = 0 |
| Simple Sum | y1 + y2 + ... + yn is TRUE |
| Linear Constraint | y1 + y2 + ... + yn >= 1 |
| Simple Product | y1 * y2 * ... * yn is TRUE |
| Linear Constraints | y1 = 1, y2 = 1, ..., yn = 1 |
| | (or, y1 + y2 + ... + yn = n) |

Any statement may include negated variables. A term yi' in an expression is represented by (1−yi) in the translation to a linear constraint. Thus, stating that y' is TRUE translates to 1−y=1, which is equivalent to y=0. The statement y1+y2'+y3' is TRUE may be translated as y1+(1−y2)+(1−y3)>=1, which also can be written as y1−y2−y3>=−1.

Negations will be omitted from formulas, with the understanding that any variable y that is negated in a logical expression is mapped to (1−y) in a corresponding linear constraint.

Translation formulas for a general depth-0 expression are illustrated by the example displayed in Table 3. Each linear constraint corresponds to a distinct combination of one factor from each product in the sum. The formulas also hold when there are no z-terms (i.e., k=0). When there are z-terms, we could view each zi as a product with one factor, and the general rule of taking one factor from each product would hold.

TABLE 3

| Translation of Depth-0 Expressions | |
|---|---|
| Assertion | z1 + ... + zk + y1 * ... * ym + u1 * ... * un + v1 * ... *vp is TRUE |
| m × n × p linear constraints | z1 + ... + zk + yi + uj + vs >= 1, i = 1, ... m, j = 1, ... n, s = 1, ... , p |

If there are r summands that are simple products and they have, respectively, m1, m2, . . . , mr factors, the expression translates to m1× . . . ×mr constraints. For example, a sum that includes three simple products with m1=m2=m3=20 would require 8,000 constraints. If it is desirable to avoid excessive linear constraints, a configurable threshold M may be introduced which causes the ith product to be replaced by an auxiliary variable if mi>=M. It is possible to define an auxiliary variable that replaces a product using 2 linear constraints (or a larger number of very simple linear constraints). Thus, a sum that includes three products with m1=m2=m3=20 could be translated to 7 linear constraints at the cost of introducing three new variables to the problem.

It is worth noting that any logical expression, no matter how complicated, can be expressed as a sum of products. For example, an expression can be converted to a sum of products by expanding all negations of phrases, multiplying out products of expressions using the first distributive law, a*(b+c) =a*b+a*c, and removing all unnecessary parentheses. In the result, only individual terms will be negated. Another method uses an expression's truth table to write the sum of products.

However, in both cases this formulation usually includes a huge number of simple products and the number of terms in the simple products may blow up into a large number of variables. This would lead to either introducing a large number of auxiliary variables to replace big-product terms or to direct translation into an immense number of linear constraints; this is rarely an efficient method. Therefore, embodiments disclosed herein convert very complex expressions to simple ones by a frugal introduction of auxiliary variables as well as other techniques disclosed herein.

Translation formulas for expressions that include products-of-sum factors are illustrated by the example displayed in Table 4. Each zi may be considered a "product" with one factor. The product t1* . . . *tm*(y1+ . . . +yn) contains m+1 factors and (u1+ . . . +up)*(v1+ . . . +vq) contains two factors. As was the case for Table 3, each constraint corresponds to a selection of one factor from each product. There are 1*(m+ 1)*2 different combinations of factors and hence 2m+2 linear constraints. Note that multiplying out the expression would lead to m×n+p×q products.

TABLE 4

Translations of expressions that include Products-of-Sums

| | |
|---|---|
| Assertion | z1 + . . . + zk + t1* . . . * tm*(y1 + . . . + yn) + (u1 + . . . + up)*(v1 + . . . + vq) is TRUE |
| (m + 1) × 2 linear | z1 + . . . + zk + ti + (u1 + . . . + up) >= 1, i = 1, . . . m<br>z1 + . . . + zk + ti + (v1 + . . . + vq) >= 1, i = 1, . . . m |

TABLE 4-continued

Translations of expressions that include Products-of-Sums

| | |
|---|---|
| constraints | z1 + . . . + zk + (y1 + . . . + yn) + (u1 + . . . + up) >= 1<br>z1 + . . . + zk + (y1 + . . . + yn) + (v1 + . . . + vq) >= 1 |

Table 5 illustrates translation formulas that are more complicated. The factors in the first product are sums-of-products. There is a set of linear constraints for each combination of a factor from the first product with a factor from the second product, yielding 6 sets of constraints. Within each set, for each sum-with-products, there is a separate constraint for each combination of factors from its products. For example, constraints involving the first factor, z1+z2+y1* . . . *ym+t1* . . . *tn include every combination z1+z2+yi+tj i=1, . . . m, j=1, . . . n This set is combined with a1, a2, and the factor b1+ . . . +bk from the second summand

TABLE 5

Translations for factors that are sums-of-products

| | | |
|---|---|---|
| Assertion | (z1 + z2 + y1* . . . *ym + t1* . . . *tn)*(u1* . . . *up + v1* . . . *vq) + a1*a2*(b1 + . . . + br) is TRUE | |
| m × n + | z1 + z2 + yi + tj + a1 >= 1 | i = 1, . . . m, j = 1, . . . n |
| m × n + | z1 + z2 + yi + tj + a2 >= 1 | i = 1, . . . m, j = 1, . . . n |
| m × n + | z1 + z2 + yi + tj + b1 + . . . + bk >= 1 | i = 1, . . . m, j = 1, . . . n |
| p × q + | ui + vj + a1 >= 1 | i = 1, . . . p, j = 1, . . . q |
| p × q + | ui + vj + a2 >= 1 | i = 1, . . . p, j = 1, . . . q |
| p × q | ui + vj + b1 + . . . + bk >= 1 | i = 1, . . . p, j = 1, . . . q |

Table 6 displays the most general situation. The expression includes summands whose factors are simple products and products-of-sums. The initial z1+z2 may be considered a "product" that has one factor—itself.

As before, the first act employed by some embodiments is to select one factor from each summand. Then, if a chosen factor F includes a sum-with-products, there is a separate constraint for each combination of factors selected from F's internal summands.

We may represent the whole expression as Z+Y*U+ b1*b2*C*E, where $$Z=z1+z2$$

$$Y=a1+a2+y1* \ldots *ym+t1* \ldots *tn$$

$$U=u1* \ldots *up+(v1+v2)*(v3+v4)$$

$$C=c1* \ldots *cr+d1* \ldots *ds$$

$$E=e1+e2*e3$$

The combinations of factors are (Z,Y,b1) (Z,Y,b2) (Z,Y,C) (Z,Y,E)

(Z,U,b1) (Z,U,b2) (Z,U,C) (Z,U,E)

The tabulation below shows the terms that will represent each factor.

| Factor | Terms in Constraint |
|---|---|
| $Z = z_1 + z_2$ | $z_1 + z_2$ |
| $Y = a_1 + a_2 + y_1 * \ldots * y_m + t_1 * \ldots * t_n$ | $a_1 + a_2 + y_i + t_j\ i = 1, \ldots m, j = 1, \ldots n$ |
| $U = u_1 * \ldots * u_p + (v_1 + v_2)*(v_3 + v_4)$ | $u_i + (v_1 + v_2), u_i + (v_3 + v_4)$ |
| | $i = 1, \ldots, p$ |
| b1 | b1 |
| b2 | b2 |
| $C = c_1 * \ldots *c_r + d_1 * \ldots *d_s)$ | $c_k + d_h\ k = 1, \ldots, r, h = 1, \ldots s$ |
| $E = (e_1 + e_2 * e_3)$ | $e_1 + e_2, e_1 + e_3$ |

TABLE 6

A depth 1 expression that includes diverse factors

| | | |
|---|---|---|
| Assertion | $z_1 + z_2 + (a_1 + a_2 + y_1 * \ldots *y_m + t_1 * \ldots *t_n)*(u_1 * \ldots *u_p + (v_1 + v_2)*(v_3 + v_4)) + b_1*b_2*(c_1 * \ldots *c_r + d_1 * \ldots *d_s)*(e_1 + e_2*e_3)$ is TRUE | |
| m × n + | $z_1 + z_2 + a_1 + a_2 + y_i + t_j + b_1 >= 1$ | $i = 1, \ldots m, j = 1, \ldots n$ |
| m × n + | $z_1 + z_2 + a_1 + a_2 + y_i + t_j + b_2 >= 1$ | $i = 1, \ldots m, j = 1, \ldots n$ |
| m × n × r × s + | $z_1 + z_2 + a_1 + a_2 + y_i + t_j + c_k + d_h >= 1$ | $i = 1, \ldots m, j = 1, \ldots n, k = 1, \ldots r, h = 1, \ldots s$ |
| m × n + | $z_1 + z_2 + a_1 + a_2 + y_i + t_j + e_1 + e_2 >= 1$ | $i = 1, \ldots m, j = 1, \ldots n$ |
| m × n + | $z_1 + z_2 + a_1 + a_2 + y_i + t_j + e_1 + e_3 >= 1$ | $i = 1, \ldots m, j = 1, \ldots n$ |
| p + | $z_1 + z_2 + u_i + (v_1 + v_2) + b_1 >= 1$ | $i = 1, \ldots p$ |
| p + | $z_1 + z_2 + u_i + (v_3 + v_4) + b_1 >= 1$ | $i = 1, \ldots p$ |
| p + | $z_1 + z_2 + u_i + (v_1 + v_2) + b_2 >= 1$ | $i = 1, \ldots p$ |
| p + | $z_1 + z_2 + u_i + (v_3 + v_4) + b_2 >= 1$ | $i = 1, \ldots p$ |
| p × r × s + | $z_1 + z_2 + u_i + (v_1 + v_2) + c_k + d_h >= 1$ | $i = 1, \ldots p, k = 1, \ldots r, h = 1, \ldots s$ |
| p × r × s + | $z_1 + z_2 + u_i + (v_3 + v_4) + c_k + d_h >= 1$ | $i = 1, \ldots p, k = 1, \ldots r, h = 1, \ldots s$ |
| p + | $z_1 + z_2 + u_i + (v_1 + v_2) + e_1 + e_2 >= 1$ | $i = 1, \ldots p, j = 1, \ldots q$ |
| P | $z_1 + z_2 + u_i + (v_3 + v_4) + e_1 + e_3 >= 1$ | $i = 1, \ldots p, j = 1, \ldots q$ |

The total number of constraints generated for the example in Table 6 is

4×m×n+m×n×r×s+6×p+2×p×r×s

If some of the products of variables have a many factors, a large number of constraints will be generated. For example, if m=n=20 and p=r=s=10 then the number of constraints is 4×20×20+20×20×10×10+6×10+2×10×10×10=43,660.

If it is desirable to reduce the number of linear constraints, some embodiments can employ a configurable threshold that can be used to determine when a product of variables should be replaced by an auxiliary variable. For example, if the y and t products are replaced by auxiliary variables, the number of constraints may be reduced to 2,168. Substituting an auxiliary variable for the u product may reduce the number to 226.

At this point, the process for translating an expression S of depth at most 1 that is a sum of sub-expressions should be clear. Formally, let $S = S_0 + S_1 + \ldots + S_n$, where $S_0$ is either void or is a simple sum, and for i>=1, Si is a simple product or a depth 1 product. Define Fi[j]=the jth factor in Si.

According to some embodiments, the first act is to enumerate all the ways that one factor can be selected from each Si; for example, one choice might be the second factor, F1 [2], from S1, the fifth, F2[5], from S2, and so forth.

Definition (F-selection): An F-selection is a selection of one Fi[ ] factor from each Si.

An F-selection can be represented as

F1[j1], ..., Fn[jn].

where j1, j2, etc are the indices of the selected factors.

If each of the selected factors in an F-selection is an individual variable or a sum of variables, then there is only one corresponding linear constraint, which is $S_0 + F_1[j_1] + \ldots + F_n[j_n] >= 1$.

But if a factor F is a sum $F = G_1 + \ldots + G_k, k >= 2$ and one or more of the Gi is a simple product, F gives rise to a family of constraints, one for each combination of variables that can be selected from the Gi. For example, in Table 6, factor $(c_1 * \ldots *c_r + d_1 * \ldots *d_s)$ contributes r+s combinations, $c_i + d_j$. Each such sum must be combined with the terms and sums contributed by the other n–1 F-factors in the F-selection.

The translations in Table 7 are not strictly required for this method. However, in some embodiments, users may prefer to enter logical constraints as implications, and it may be useful to use direct translations for the simplest expressions.

TABLE 7

Translations of simple implications

| | |
|---|---|
| z → OR | $z → (y_1 + y_2 + \ldots + y_n)$ |
| Linear Constraint | $y_1 + \ldots + y_n - z >= 0$ |
| OR → y | $(z_1 + z_2 + \ldots + z_k) → y$ |
| Linear Constraint | $ky - (z_1 + \ldots + z_k) >= 0$ |

TABLE 7-continued

Translations of simple implications

| | |
|---|---|
| Equivalent to $z_i \to y$ | $y - z_i \geq 0$  $i = 1, \ldots, k$ |
| k linear constraints | |
| $z \to$ AND | $z \to (y_1 * y_2 * \ldots * y_n)$ |
| Linear Constraint | $y_1 + \ldots + y_n - nz \geq 0$ |
| AND $\to y$ | $(z_1 * z_2 * \ldots * z_k) \to y$ |
| Linear Constraint | $z_1 + \ldots + z_k - y \leq k - 1$ |
| AND $\to$ OR | $(z_1 * z_2 * \ldots * z_k) \to (y_1 + y_2 + \ldots + y_n)$ |
| Linear Constraint | $z_1 + \ldots + z_k - (y_1 + \ldots + y_n) \leq k - 1$ |
| Linear Constraint | $(1 - z_1) + (1 - z_2) + \ldots + (1 - z_k) + y_1 + y_2 + \ldots + y_n \geq 1$ |
| AND $\to$ AND | $(z_1 * z_2 * \ldots * z_k) \to (y_1 * y_2 * \ldots * y_n)$ |
| Linear Constraint | $n \cdot (z_1 + \ldots + z_k) - (y_1 + \ldots + y_n) \leq n(k - 1)$ |
| n Linear Constraints | $z_1 + z_2 + \ldots + z_k - y_i \leq k - 1$, $i = 1, \ldots, n$ |
| If $k = 1$, n linear constraints. | $y_i \geq z_1$  $i = 1, \ldots, n$ |
| OR $\to$ OR | $(z_1 + z_2 + \ldots + z_k) \to (y_1 + y_2 + \ldots + y_n)$ |
| Linear Constraint | $k(y_1 + \ldots + y_n) - (z_1 + \ldots + z_k) \geq 0$ |
| k linear constraints | $y_1 + y_2 + \ldots + y_n - z_i \geq 0$  $i = 1, \ldots, k$ |
| OR $\to$ AND | $(z_1 + z_2 + \ldots + z_k) \to (y_1 * y_2 * \ldots * y_n)$ |
| k linear constraints | $y_1 + y_2 + \ldots + y_n - nz_j \geq 0$  $j = 1, \ldots, k$ |
| n × k linear constraints | $y_j \geq z_i$  $i = 1, \ldots, k$  $j = 1, \ldots, n$ |

Linear Constraints for Auxiliary Variables

According to various embodiments, an auxiliary variable w is defined in a way that makes it equivalent to the phrase A that it replaces. This may be accomplished by means of two or more linear constraints. One constraint (or set of constraints) assures that $w \to A$ and the other set assures that $A \to w$. The result is that w and A have the same truth values. If w is true, A is true. If w is false, A is false.

Some embodiments described herein manifest an appreciation that an optimization engine that solves problems that include binary variables usually searches a tree with many nodes, cutting off unnecessary branches along the way. Thus these embodiments use two-way implications to immediately cut off unnecessary branches that would otherwise be searched in order to solve an optimization problem.

Using equivalence also guarantees that w can safely be used to represent phrase A anywhere it appears in any logical constraint in the problem. On the other hand, if $w \to A$ was the only constraint, then $w = 0$ does not assure that A is false and A' is true. A consequence is that a substitution would be invalid wherever A' appears, or where A is nested within a larger expression that is negated.

In the disclosed method for converting a complex logical constraint to a set of linear constraints, some embodiments use auxiliary variables to replace rank 1 phrases and, optionally, simple products.

An auxiliary variable w is equivalent to a simple product $x_1 * x_2 * \ldots * x_k$ when $$w \to x_1 * \ldots * x_k \text{ and } x_1 \ldots * x_k \to w.$$

These implications are equivalent to $$w' + x_1 * x_2 * \ldots * x_k \text{ is TRUE, and } x_1' + \ldots + x_k' + w \text{ is TRUE.}$$

Table 8 displays the corresponding linear constraints. These constraints force w to have exactly the same truth values as the phrase that it replaces. Other formulas that are algebraically or logically equivalent may be used. As usual, if a negated term $x_i'$ appears, replace $x_i'$ with $(1 - x_i)$ in the linear constraint

TABLE 8

Implications for the Auxiliary Variable of a simple AND Phrase

| Implications | Linear Constraint Formulas |
|---|---|
| $w \to x_1 * x_2 * \ldots * x_k$ | $x_i \geq w$, $i = 1, \ldots, k$ or $x_1 + x_2 + \ldots + x_k - k \cdot w \geq 0$ |
| $x_1 * x_2 * \ldots * x_k \to w$ | $x_1 + x_2 + \ldots + x_k - w \leq k - 1$ |

The linear constraints for an auxiliary variable that replaces a product-of-sums correspond to w'+product-of-sums is TRUE, which has depth 1 w+sum-of-products is TRUE, which has depth 0.

The value of including a factor that is a sum of terms in the auxiliary variable substitution depends on whether the number of its summands meets a threshold.

The linear constraints for an auxiliary variable that replaces a depth 1 phrase A in an expression E are similar to those used to translate a logical expression of depth 1. The implication $w \to A$ is equivalent to w'+A which is a depth 1 phrase. Prefacing formulas similar to those in Table 6 with "w'+" provides the required set of linear constraints.

The implication $A \to w$ is equivalent to

A'+w.

Note that if A is a product, $$A = A_1 * \ldots * A_n,$$

then each $A_i$ is a term, a simple sum factor, a simple product factor, or a sum-with-products factor. The complement of a product of factors is the sum of the complements. The complement of a term, a simple sum, or a simple product has depth 0. The complement of a sum-with-products has depth 1. For example, if $$A = y_1 * y_2 * y_3 * (u_1 + u_2 + u_3) * (v_1 + v_2 + v_3 * v_4 + v_5 * v_6 * v_7)$$

then $$A' = y_1' + y_2' + y_3' + u_1' * u_2' * u_3' + v_1' * v_2' * (v_3' + v_4') * (v_5' + v_6' + v_7')$$

Thus if A is a product, A'+w has depth at most 1 and can be translated using formulas similar to those in Table 2 or Table 6. On the other hand, if A is a sum of sub-expressions $$A = A1 + \ldots + An$$

then A→w is equivalent to $$A1 \rightarrow w$$
$$\ldots$$
$$An \rightarrow w$$

Each Ai summand is a term or a product whose factors are terms, simple sums or sums-with products. As was noted above, the complement of a depth 1 product has depth at most 1 so $$Ai' + w$$

has depth at most 1 and can be translated by embodiments in accordance with the present invention to linear constraints following the method of Table 6.

Removing Unnecessary Parentheses

Various embodiments include a process for removing unnecessary parentheses that makes it possible to consolidate simple sums, simple products, and depth 1 expressions. Combined with ordering, some expressions can be simplified by applying identities such as x+x'=1.

The process that follows removes parentheses around a sub-expression, (expr) that is surrounded by an appropriate context. The context is determined by the symbol that precedes (expr) and by either one or two symbols that follow it.

Actions in accordance with the rules may be executed in any order. According to some embodiments, execution of the rules is iterated until no further changes occur in the statement.

BEGIN(expr) means that nothing precedes (expr); it is at the beginning of its containing expression. Similarly (expr) END means it is at the end.

As discussed above, expressions in this disclosure are written in terms of variable families xi and wi. Identifiers yi will be used in the follow when a placeholder for a variable is needed in the following.

RULE 1. If the context is +(expr)+, BEGIN(expr)+,+(expr) END, BEGIN(expr)END, remove the parentheses RULE 2. If the context is ((expr)), remove the inner set of parentheses. RULE 3. If the context is (yi) or (yi)' remove the parentheses. RULE 4. If the context is (yi')', replace with yi. RULE 5. If the context is an expression in redundant complements, ((. . .)')' remove the outer set of parentheses and both complements.

RULE 6. If the context (y1*. . .*yn) is not complemented, remove the parentheses. RULE 7. If the context is a product of factors (A1*. . .*An) that is not complemented, remove the outer parentheses.

RULE 8. If (y1*. . .*yn)' is not a factor in a product, expand the complement and remove the parentheses.

RULE 9. If the context is a complemented sum of terms (y1+. . .+yn)', expand and write as y1'*..*yn'.

RULE 10. If an entire expression has the form (E)', where E is a product of two or more factors, A1*. . .*An, rewrite (A1*. . .*An)' in the form A1'+. . .+An'.

Each of processes disclosed herein include a sequence of acts in a particular example. Some acts are optional and, as such, may be omitted in particular embodiments in accordance with the present invention. Additionally, the order of acts can be altered, or other acts can be added, without departing from the scope of the present invention. As discussed above, in at least some examples, the acts deal with data representative of tangible, physical objects. In addition, as discussed above, the acts may be performed on a particular machine, namely a computer system, such as the general purpose computer system discussed with regard to FIG. 12, that is specially and specifically configured to execute acts and processes disclosed herein.

Implementation Considerations

Some embodiments in accordance with the present invention are be integrated into a system that provides database storage for problem parameters, variables, linear constraints, logical constraints, and problem results. Subsets of the parameters and constraints may be selected and given a specific identity, and optimization results may be stored in a historical database.

Storing logical constraints through data input, and then automatically converting to linear constraints rather than using customized programming relieves the analyst of the need to update statements at the computer program or API level, and therefore relieves the need to rewrite and sometimes recompile software.

A system supporting problem and results storage may also make it possible to update or vary the data values and constraints at the input level. This is significant because running many optimization scenarios across a range of parameter values often is desirable. It may be important to perform optimizations across a range of "what if" scenarios to study effects such as possible cost overruns or incorrect risk assessments. Such optimizations may also need to be rerun when there are changes to parameters, business requirements, regulations, or other concerns. The results can be compared with the historic results.

The need for custom programming increases the difficulty of correlating and documenting the relationship between various versions of the inputs and their resulting outputs; it significantly increases the likelihood of errors. A system that supports the storage and management of multiple alternate sets of problem input data (including alternative sets of logical constraints) may be very beneficial.

Furthermore, it is appreciated that often no individual optimization package can guarantee results that are optimal for all problems. Thus, it is often beneficial to submit a problem to two or more optimizers, but the requirement to code in multiple proprietary languages or APIs makes this extra effort very costly and time-consuming.

Optimizing at the Microproject Level

The task of selecting a set of projects and/or activities that will provide the greatest value from a list of hundreds (or even thousands) of proposed projects is a common and recurring business optimization problem. Examples include:

S1: A Telecom company that needs to choose which old services should be upgraded and which new services it should implement.

S2: A financial institution that wishes to add online investment services to its offerings. The institution must choose a set of transactions that will be implemented for its initial service offering.

S3: A software development company that wishes to release a new product within a year. The company has gathered a long list of requirements and wishes to implement the set that provides an optimal first release.

Many organizations use a method called pipelining to carry out a large project. The project may be broken into many very small microprojects. A microproject generally has low risk. For a microproject, it is relatively easy to estimate duration and then to estimate cost by expressing it in terms of expected manpower. The order in which the microprojects should be implemented may be determined for a value parameter (such as cost or the speed of completion of an enveloping task), using a set of linear and logical constraints on manpower, and logical constraints relating to project and microproject interdependencies. The ordered list ("stack") of microprojects is dynamic and may change frequently during the development process. Embodiments disclosed herein provide a very convenient tool for ordering, reordering, and managing the microproject stack.

Optimizing at the Project Level

A project may contain baseline sub-projects that must be carried out if the project is implemented, as well as a set of optional sub-projects. Any sub-project may have its own baseline and optional sub-projects. Sub-projects can be nested to any depth. Any project or sub-project may have parts that have been organized as microprojects.

A proposed activity, such as St, S2, or S3 above, can be tested by creating a Case that includes a hierarchy of projects, their estimated cost, value, and risk parameters, and the constraints that apply to the Case. Aspects disclosed herein may choose the projects and sub-projects within a Case in a way that maximizes a value parameter while satisfying budget and other constraints for the Case.

An organization's portfolio of proposed projects may include inter-related parts. An individual project, sub-project, or microproject may appear within multiple cases. Implementing one project may require the implementation of others, and/or only be of use when a specific set of associated projects are implemented.

The quantity to be optimized for a Case may represent gain, overall market share, or another parameter. For simplicity, the bulk of this disclosure focuses on gain, but other parameters may be optimized using aspects described herein. Each project may be assigned a gain value (which may be negative, and hence may actually be a loss). Each project may incur a cost and may be assigned a risk of failure.

A Case problem may be subject to budget constraints and other resource limitations. A Case may also be bound by interdependencies among projects, by business rules, by government regulations and other considerations. Budget and other resource constraints may be expressed via linear inequalities, such as, for example:

LIN.1 The Cost of Implementing the Phase-1 Set of Transactions Must be $\leq \$2,000,000$.

Other constraints may take the form of logical assertions that express relationships between projects, business rules, and regulations, for example:

LOG.1 If project P10 is implemented, P1 and P4 must also be implemented.

LOG.2 If projects P2, P3, and P22 are implemented, do not implement P17 or P18.

LOG3: Regulations require that if we implement the mortgage service transactions, we must implement transactions that check for bankruptcies and current solvency."

Logical constraints can be complex expressions. They can interact with the linear constraints, affect the overall cost, and influence the value outcome.

One embodiment of the present invention provides a computer-based environment for defining, storing, updating, and viewing an organization's current portfolio of projects, the cost, risk, and value parameters associated with each project, the constraint relationships between projects, and the logical constraints imposed by the relationships between projects, business rules, regulations and/or other concerns.

Cases

Figure 5:
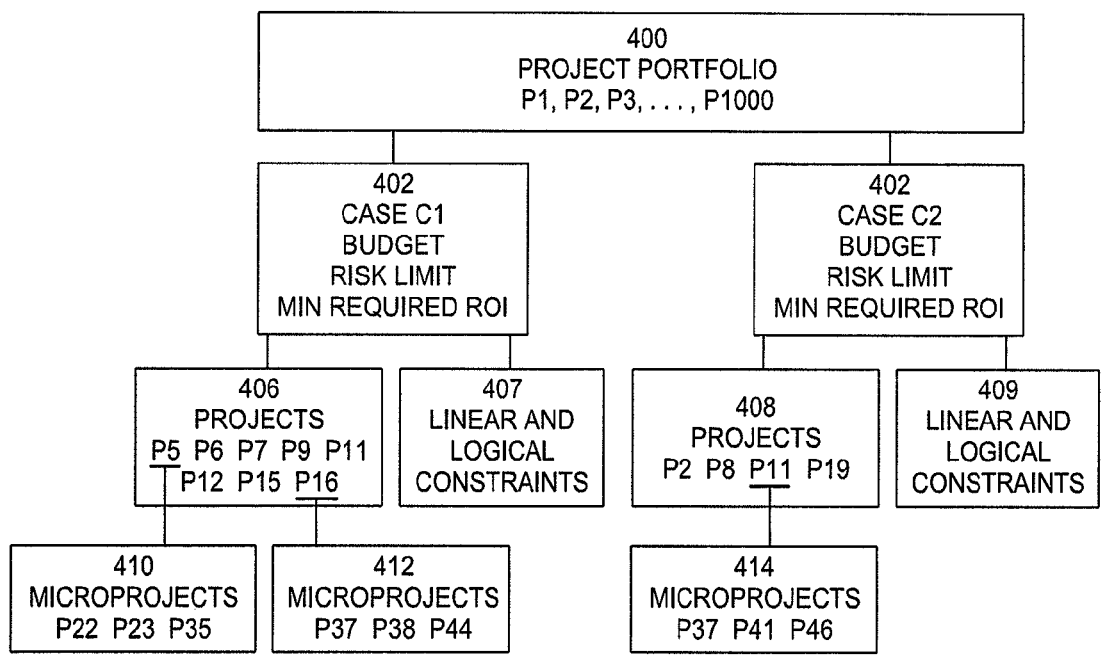
FIG. 5 illustrates a hierarchical set of projects, the execution of which may be optimized according to an embodiment.

FIG. 5 illustrates a pair of Cases that may be defined within a particular project portfolio. In general, a Case project hierarchy may include any number of levels. The lowest level might include microprojects. The displayed hierarchy includes only projects and microprojects.

In the embodiment depicted in FIG. 5, box 400 represents an organization's full portfolio of projects. As illustrated in boxes 402 and 404, each Case may assigned an overall budget, and may also be assigned an overall limit to risk and a minimum desired ROI. In the depicted example, the projects included in Case C1 are listed in boxes 406. Box 410 lists microprojects of P5. Box 412 similarly lists microprojects of P16. The projects included in Case C2 are listed in box 408. Box 414 lists optional microprojects of P11. Note that, in this example, project P11 occurs in both Case C1 and Case C2. Linear and logical constraints may be assigned to each case, as is illustrated in boxes 407 and 409.

Project Data Entry

Figure 6:
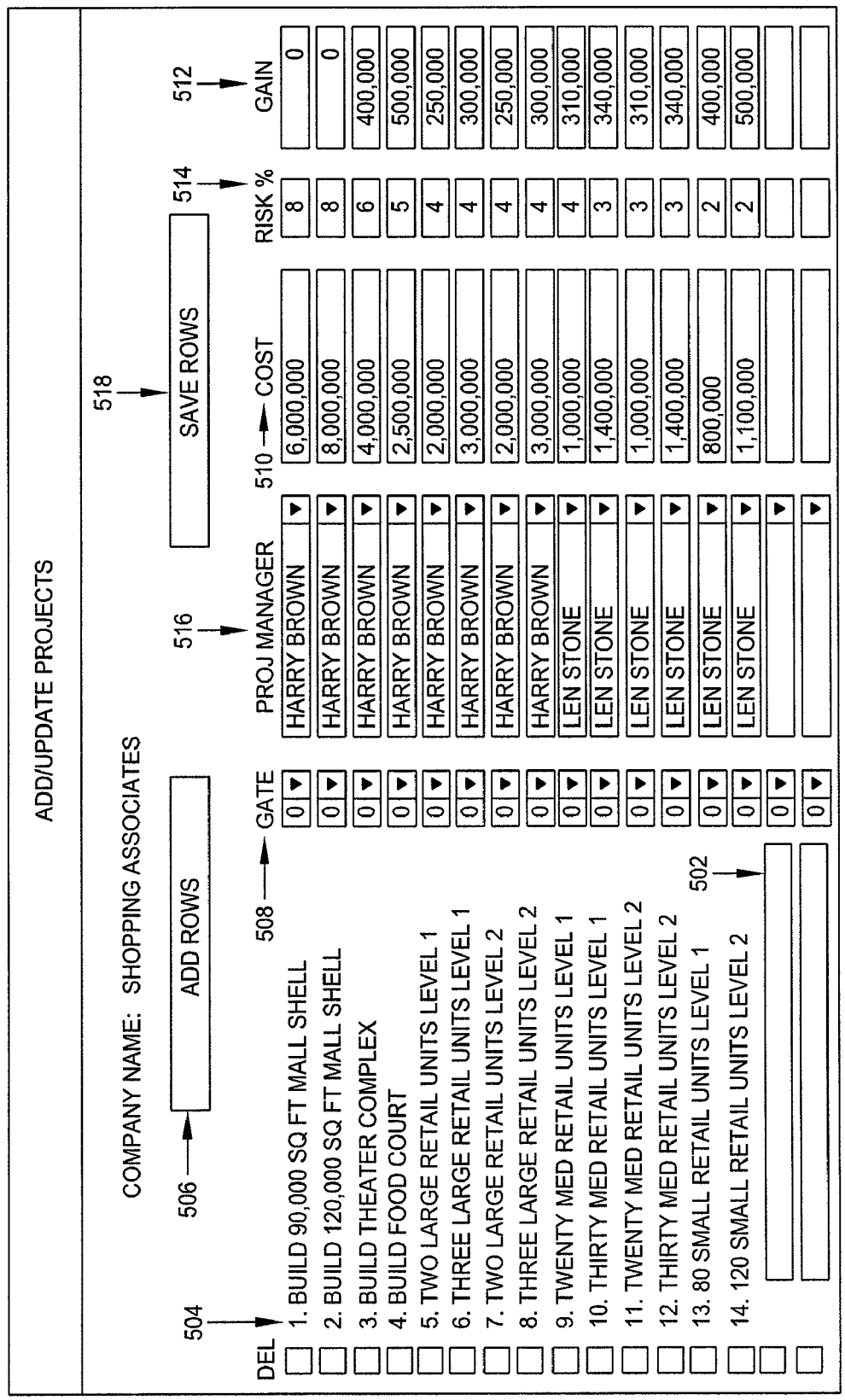
FIG. 6 shows an example user interface screen for adding projects according to an embodiment.

One embodiment provides a graphical user interface for entering, viewing, and updating an entire portfolio of projects, along with cost, risk, and gain values. FIG. 6 illustrates a model screen that may be used to view, update, add, and/or delete projects in the organization's portfolio. Project names may be entered into empty slots 502, and may be automatically assigned numbers 504. The project numbers 504 may correspond to assigned variable names $x1$, $x2$, $x3$, and so on. Each x-variable is restricted to take on the values 0 or 1. When a Case is optimized, value 1 may mean "implement the project" and 0 may mean "do not implement the project."

For the screen in FIG. 6, additional project slots may be opened up by clicking 506, "Add Rows." Gates (508) may correspond to various points at which each project should be analyzed and evaluated. For example, Gate 0 occurs at the Strategic Assessment and Business Justification stage, Gate 1 is the point at which you Define Project and Stakeholders, and Gate 2 occurs at Requirements Definition and Refinement. The Gate level of each project may be identified by making a choice from a drop-down box.

Each project may be assigned a cost 510, a gain 512, and optionally, a risk percentage 514. A project manager 516 may be assigned to each project. The manager names that appear in the drop-down boxes may be entered using a separate screen. Project additions and updates may be saved in the database by clicking 518 "Save Projects."

Defining Cases

A user may create and save an arbitrary number of Cases for analysis. The projects in a Case may be selected via a simple point-and-click GUI.

Figure 7:
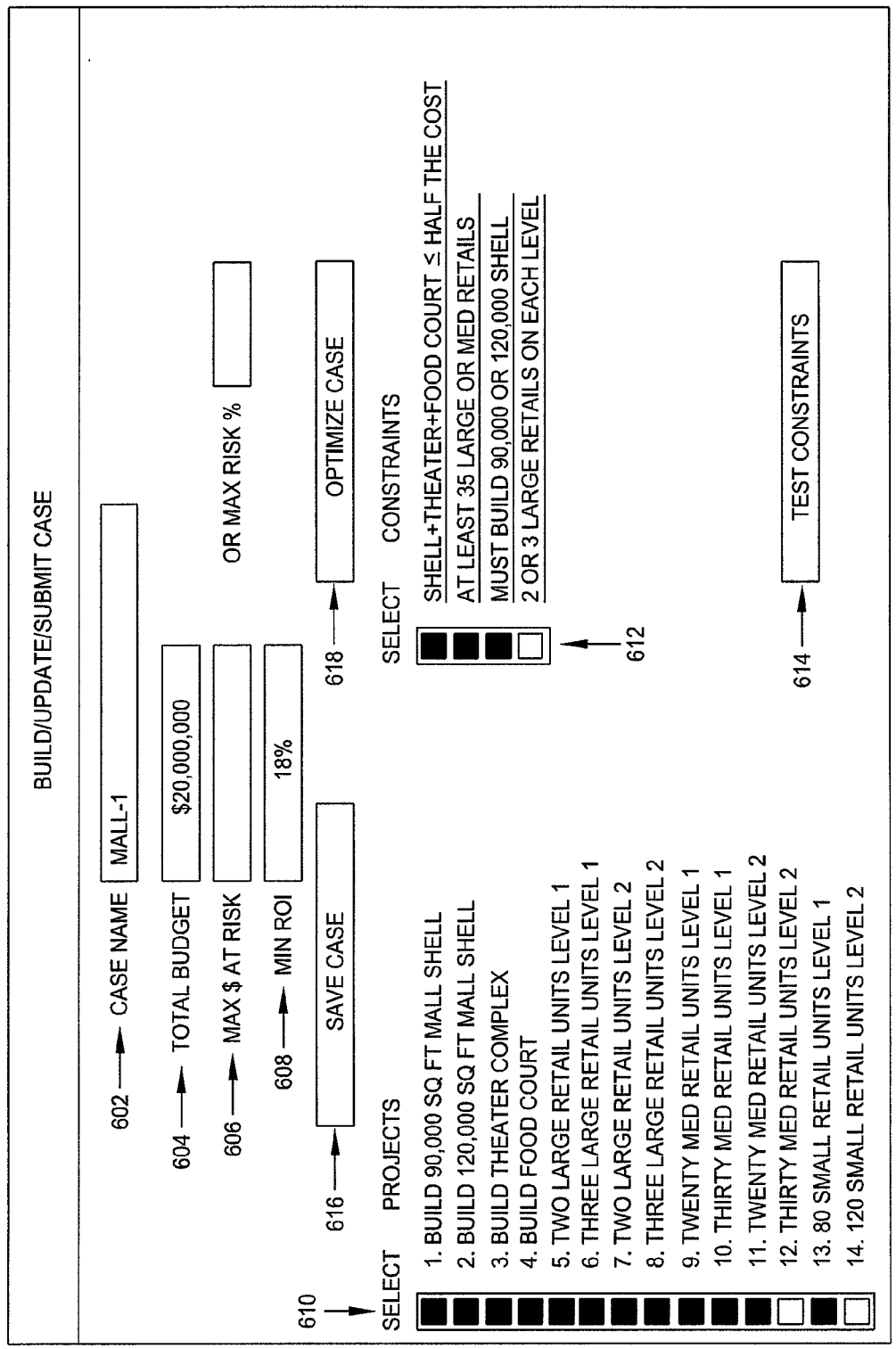
FIG. 7 depicts an example user interface screen for adding a case according to an embodiment.

FIG. 7 shows a model screen that illustrates a Case definition that includes a selected set of projects, the total budget, a minimum ROI desired, and a set of other constraints. Cases may be saved, viewed, and modified using this screen.

A user may assign a case name 602 and a total budget 604. Boxes 606 may be used to limit the maximum dollars at risk or overall risk percentage. Box 608 may be used to assign a minimum acceptable return on investment to a Case.

Projects may be selected for inclusion in a Case by clicking on the select boxes 610. Constraints may be chosen from a list 612 that has been defined elsewhere. (See FIGS. 8, 9 and 10.) The constraints may be tested for consistency by clicking 614.

A Case may be saved using the Save Case bar 616. A Case may be submitted for optimization by clicking the Optimize Case bar 618 at any time. The optimizer may choose projects that maximize gain while satisfying all constraints.

Defining Linear Constraints

Figure 8:
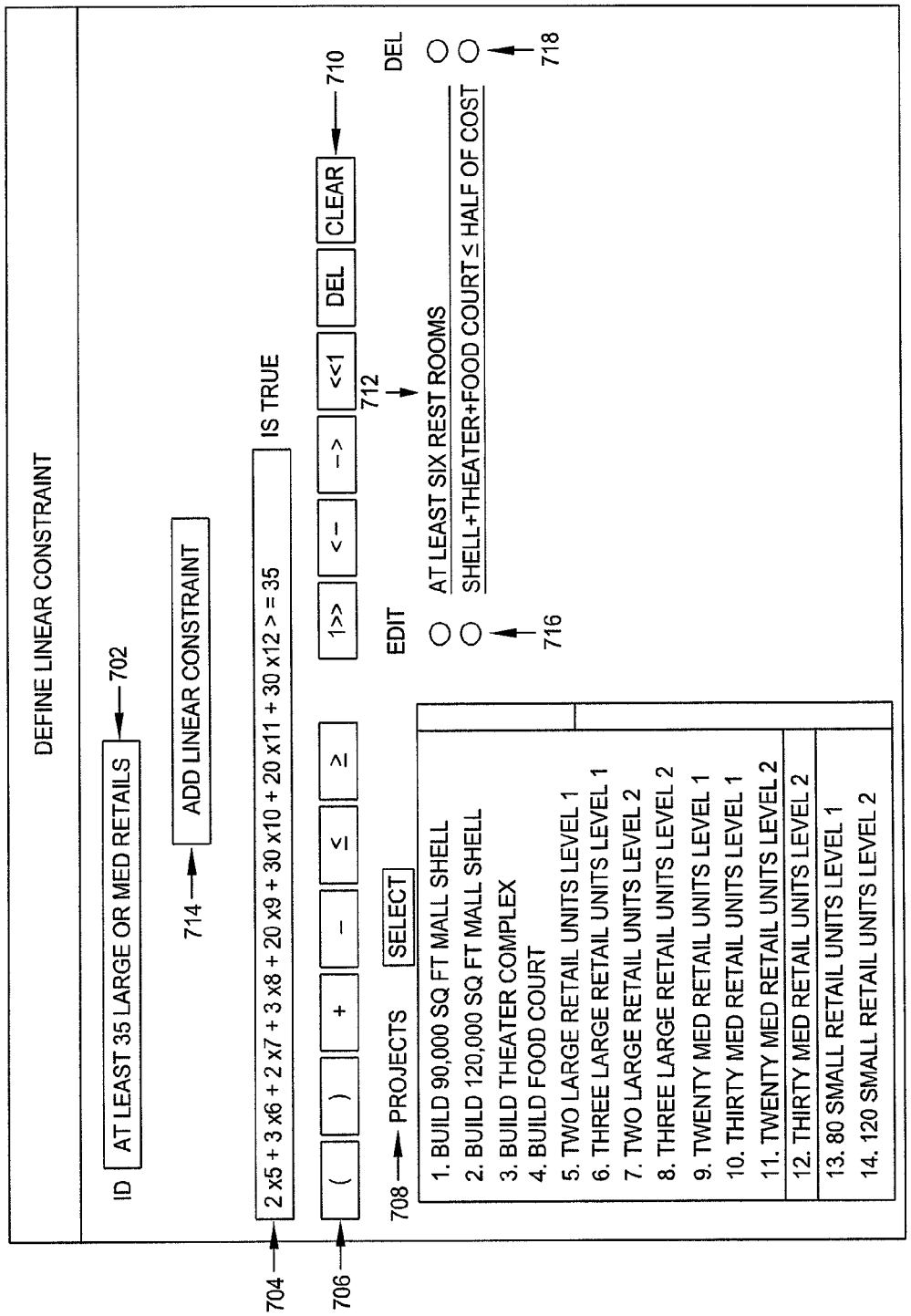
FIG. 8 shows an example user interface screen for defining linear constraints according to an embodiment.

FIG. 8 shows a model screen that may be used to enter linear constraints. Each linear constraint may be assigned a name in box 702. In this example, the formula box 704 specifies that at least 35 large or medium-sized retail units must be included in the shopping mall. A user may build a formula using the six buttons 706 and by highlighting and selecting projects 708. Corrections may be made using the six buttons 710. Each linear constraint that has been submitted may be added to the database and displayed on list 712. A new linear constraint may be added to list 712 by clicking the "Add Linear Constraint" button 714. A linear constraint may be edited or deleted by clicking on its name and clicking the edit button 716 or the delete button 718.

Defining General Logical Constraints

Figure 9:
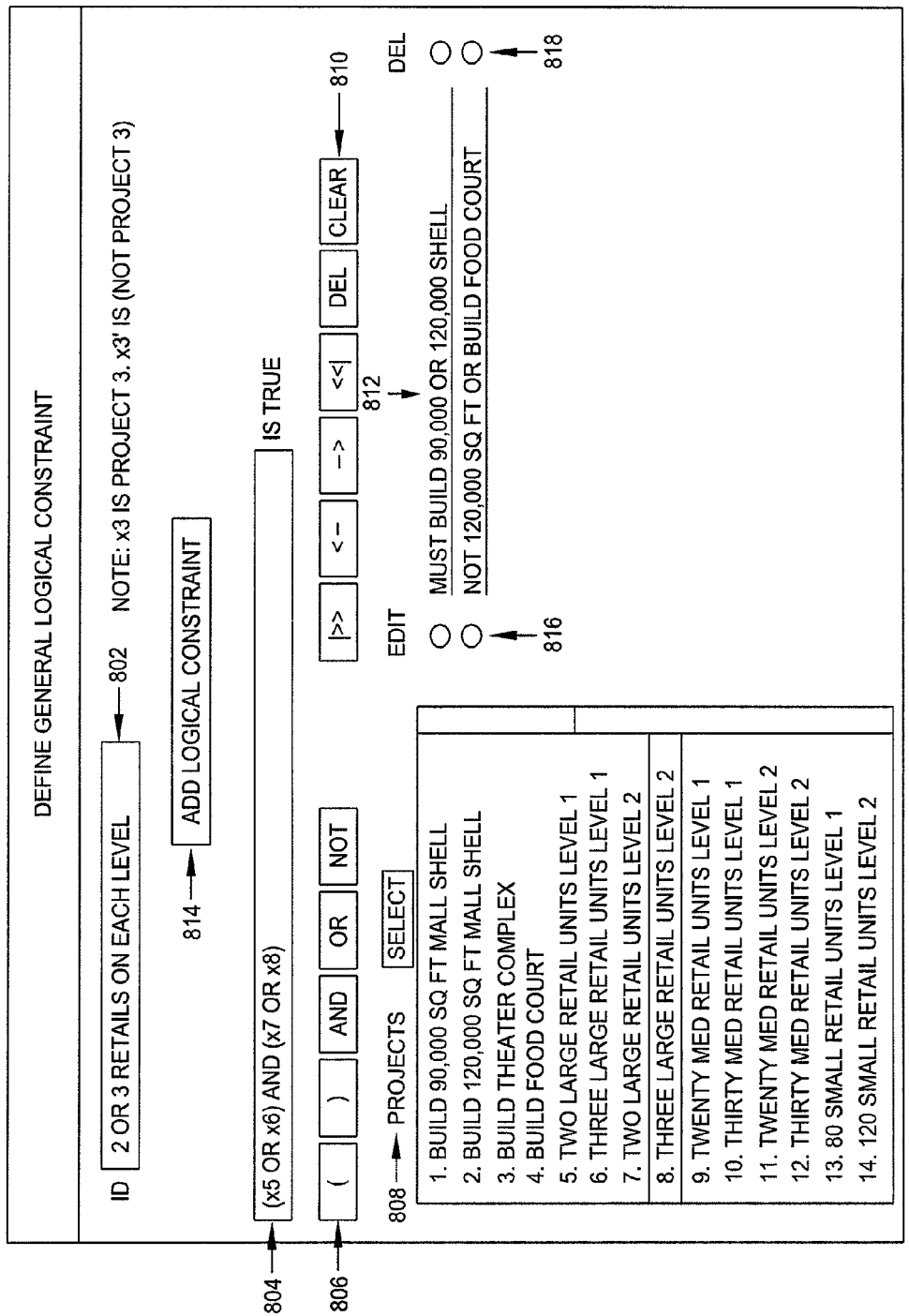
FIG. 9 depicts an example user interface screen for defining logical constraints according to an embodiment.

FIG. 9 illustrates a screen similar to FIG. 8 that may be used to enter logical constraints. Each logical constraint may be assigned a name 802. The sample logical expression 804 states that it is TRUE that there are two or three large retail units per level. The user may build a formula using the six buttons 806 and by highlighting and selecting projects under 808. Corrections may be made using the six buttons 810. Each logical constraint that has been submitted may be added to the database and displayed on list 812. A new constraint may be added to the list by clicking "Add Logical Constraint" 814. A logical constraint may be edited or deleted by clicking on its name and clicking the edit button 816 or the delete button 818.

Figure 10:
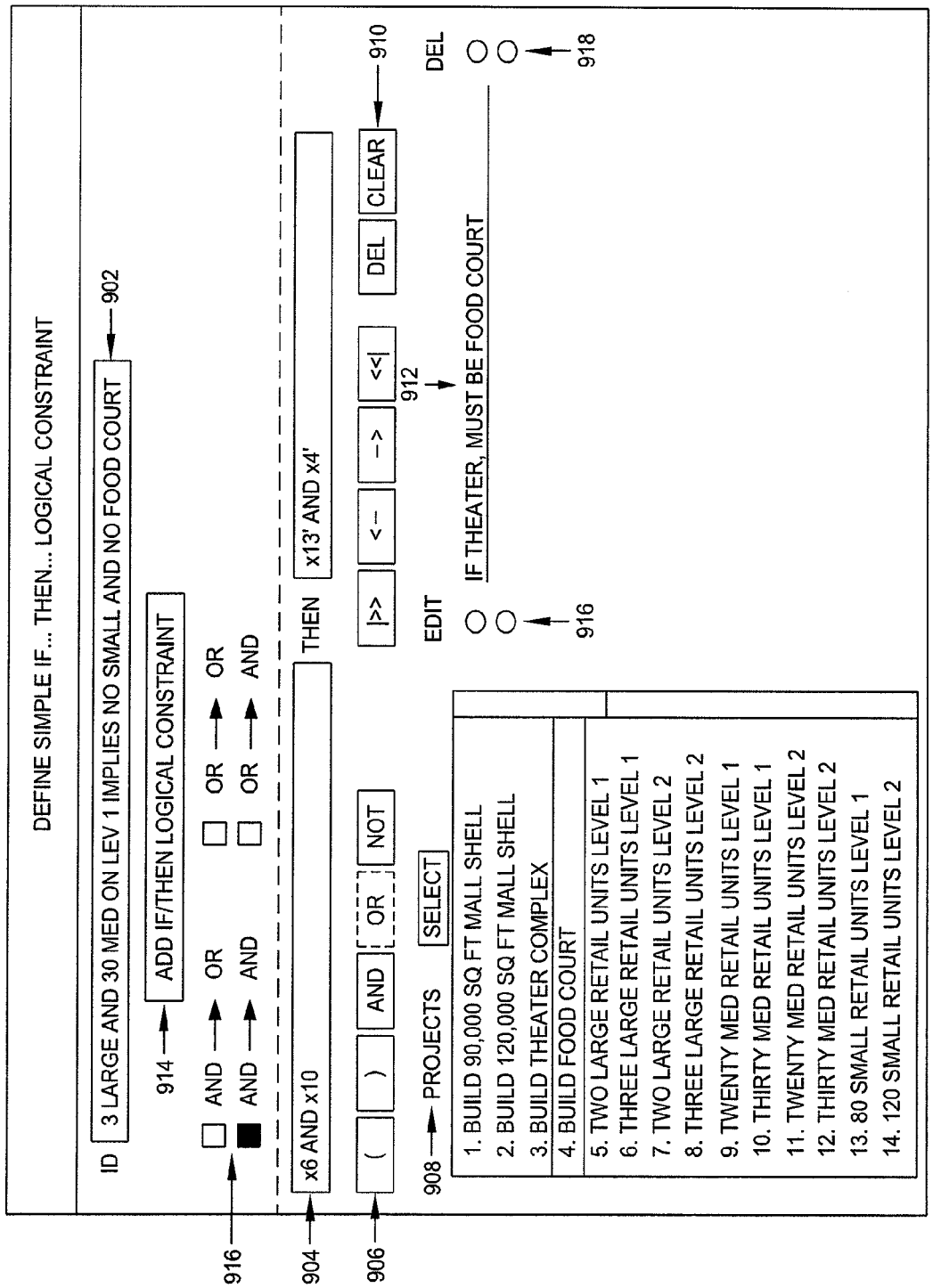
FIG. 10 illustrates another example user interface screen for defining logical constraints according to an embodiment.

FIG. 10 shows a model screen for entering if/then logical constraints in accord with aspects of the present invention. Each logical constraint may be assigned a name 902. The formula 904 states that if two large retail units and thirty medium-sized retail units are built at Level 1, then no small units will be included at that level and no food court will be implemented. The user may build formulas in the IF and THEN boxes using the six buttons 906 and by highlighting and selecting projects under 908. Corrections may be made using the six buttons 910. Each if/then logical constraint that has been submitted may be added to the database and displayed on the list 912. A new if/then logical constraint may be added to the list by clicking "Add If/Then Logical Constraint" 914. An if/then logical constraint may be edited or deleted by clicking on its name and clicking the edit button 916 or the delete button 918.

High Level Procedural Flow

Figure 11:
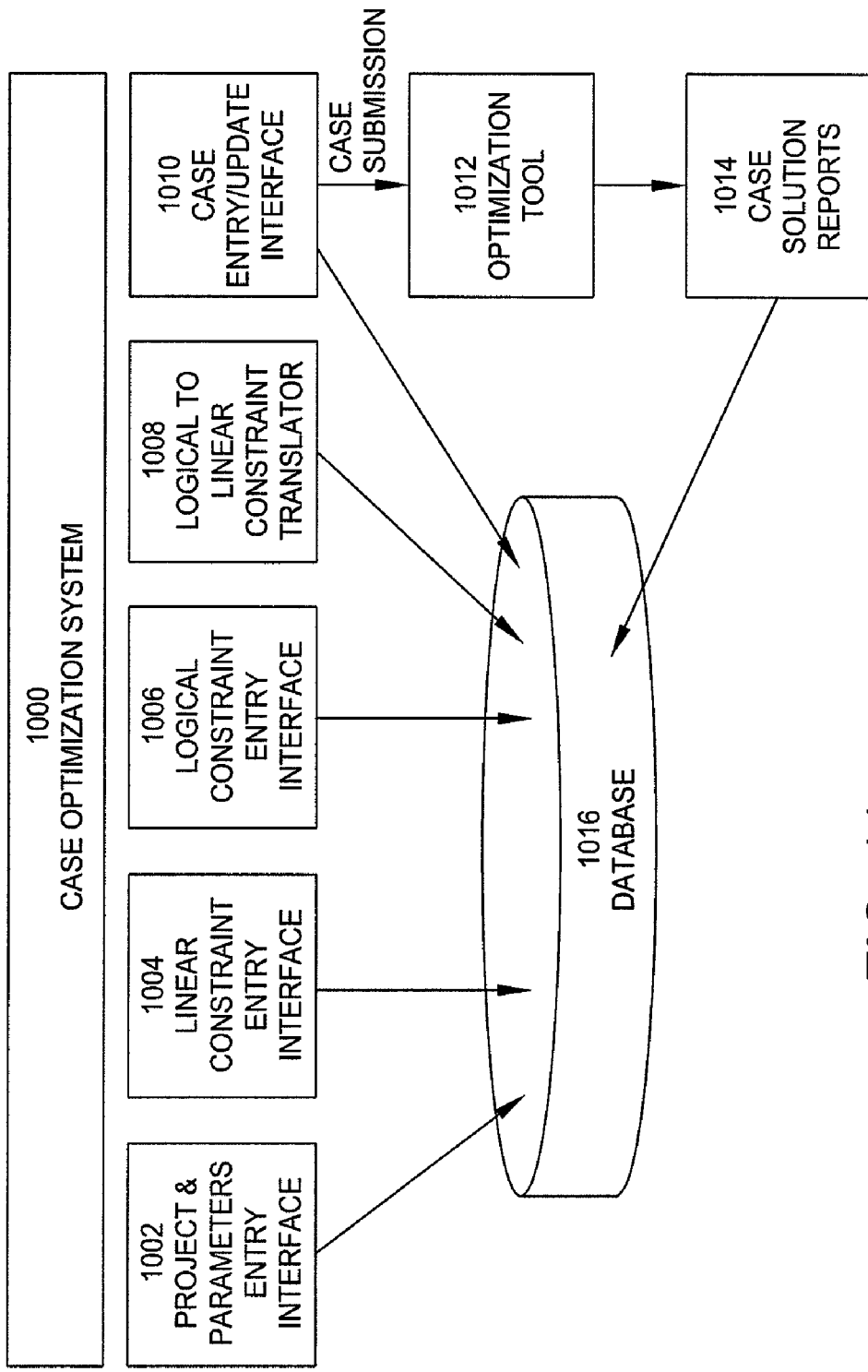
FIG. 11 shows a functional block diagram of a case optimization system according to an embodiment.

FIG. 11 illustrates a process for using a Case Optimization System. Data from screens 1002 for projects and their associated parameters, 1004 for linear constraints, 1006 for logical constraints, and 1010 for Case entries and updates may be maintained in a database 1016.

Logical constraints may be passed to step 1008 and translated, and results may be maintained in the database or recalculated for each requested optimization. The Case entry/update interface, 1010, also may be used to submit cases to the optimization tool 1012, which sends results to the Case Solution Report generator 1014. Reports may be retained in the database.

A thorough optimization analysis may depend on both current and historic data and the execution of a very large number of scenarios during an extended period of time. Consider the example S1 presented earlier of a Telecom company that needs to choose which old services should be upgraded and which new services it should implement. An analyst could first define, budget, and optimize separate Cases for the upgrade process and the new services, and then analyze them together as a single joint Case, and compare the results.

When analyzing a set of projects, it may be important to perform optimizations across a range of "what if" scenarios to study the effect of cost overruns and incorrect risk assessments. Case optimizations may also need to be rerun when there are changes to the cost constraints, business requirements, business rules and regulations and/or other concerns. The results can be compared with the historic results. The environment provided by at least one aspect disclosed herein provides for a long-term and ongoing system, with a database that provides a history of cost and risk estimations and outcomes as it grows.

General Purpose Computer System

The above defined processes, according to disclosed embodiments, may be implemented on one or more general-purpose computer systems. For example, various aspects of the invention may be implemented as specialized software executing in a general-purpose computer system 1100 such as that shown in FIG. 12. Computer system 1100 may include one or more output devices 1101, one or more input devices 1102, a processor or multiprocessor 1103 connected to one or more memory devices 1104 through interconnection mechanisms 1105 and one or more storage devices 1106 connected to interconnection mechanisms 1105. Output devices 1101 typically render information for external presentation and examples include a monitor and a printer. Input devices 1102 typically accept information from external sources and examples include a keyboard and a mouse, or a computer-to-computer interface such as web services. Processor(s) 1103 typically perform a series of instructions resulting in data manipulation.

Processor or multiprocessor 1103 is typically a commercially available processor based on Intel Xeon, Itanium, Core, Celeron, or Pentium, AMD Opteron, Sun UltraSPARC, IBM Power5+, or IBM mainframe chip technology, but may be any type of processor or multiprocessor. Memory devices 1104, such as disk drives, memories, or other devices for storing data are typically used for storing programs and data during operation of the computer system 1100. Devices in computer system 1100 may be coupled by at least one or more interconnection mechanisms 1105, which may include, for example, one or more communication elements (e.g., busses or switches) that communicate data within system 1100.

Figure 13:
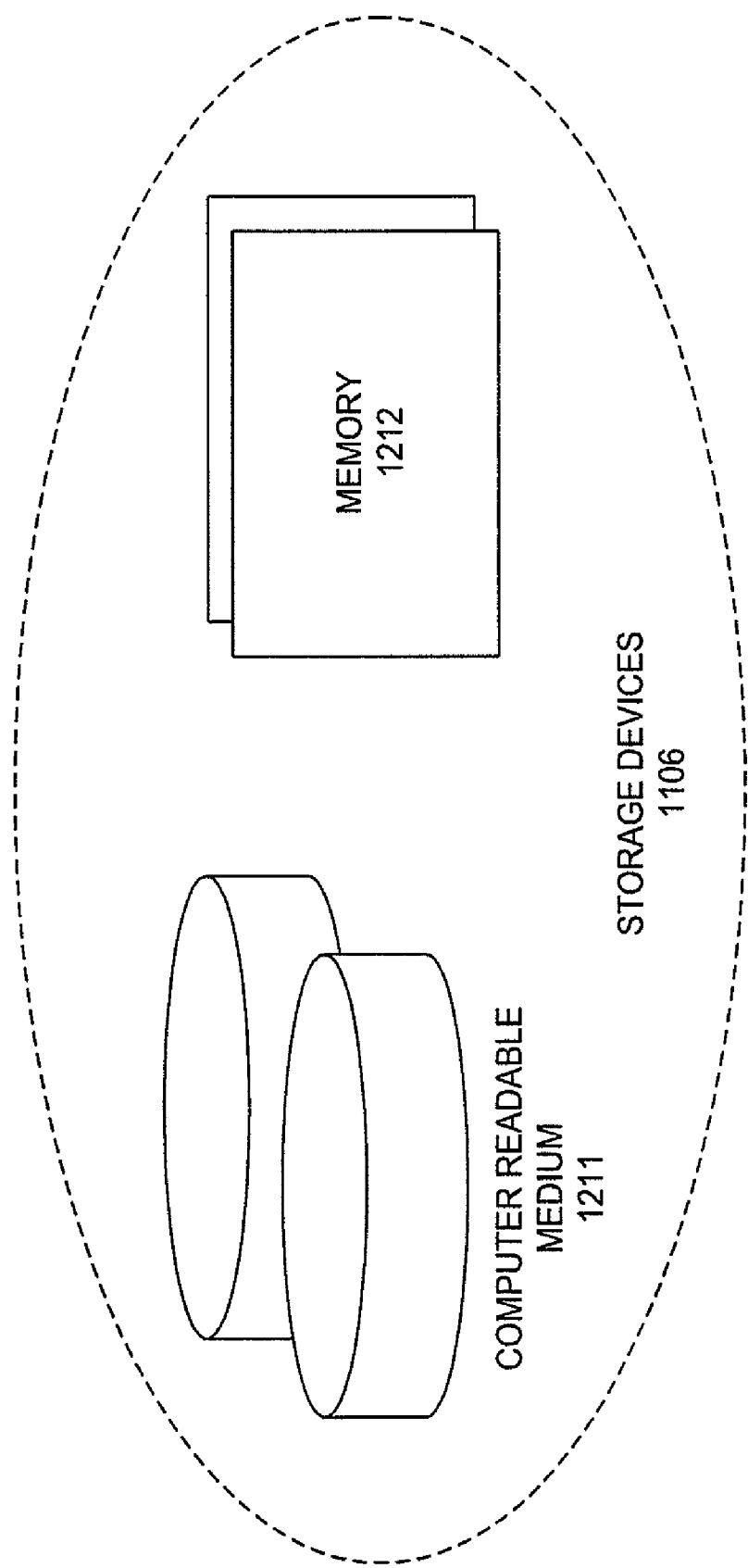
FIG. 13 illustrates types of computer readable and writable data storage media which may be configured into at least one embodiment in accordance with the present invention.

The storage devices 1106, shown in greater detail in FIG. 13, typically include a computer readable and writeable nonvolatile recording medium 1211 in which signals may be stored that define a program to be executed by the processor or information stored on or in the medium 1211 to be processed by the program. The medium may, for example, be a disk, flash memory or some other computer-readable storage medium. Typically, in operation, the processor causes data to be read from the nonvolatile recording medium 1211 into another memory 1212 that allows for faster access to the information by the processor than does the medium 1211. This memory 1212 is typically a volatile, random access memory such as a dynamic random access memory (DRAM), static memory (SRAM). Memory 1212 may be located in storage device 1106, as shown, or in a memory device 1104. The processor 1103 generally manipulates the data within the memory 1104 and 1212 and then copies the data to the medium 1211 after processing is completed. A variety of mechanisms are known for managing data movement between the medium 1212 and the memory 1104, and the invention is not limited thereto. The invention is not limited to particular memory devices 1104 or storage devices 1106.

Computer system 1100 may be implemented using specially programmed, special purpose hardware, or may be a general-purpose computer system that is programmable using a high-level computer programming language. Computer system 1100 may include cellular phones and personal digital assistants as input devices. Computer system 1100 usually executes an operating system which may be, for example, a Windows operating system available from the Microsoft Corporation, MAC OS System X available from Apple Computer, the Solaris Operating System available from Sun Microsystems, UNIX operating systems available from various sources, a Linux system, one of the various HP operating systems or various IBM operating systems. Many other operating systems may be used, and the invention is not limited to any particular implementation. Several different systems may be combined, with each playing an appropriate role. For example, an embodiment of the present invention may translate logical constraints to linear constraints using a general-purpose computer system with a Sun UltraSPARC processor running the Solaris operating system, while a user interface runs on a Windows system, a database on Linux, and an optimizing engine on an IBM mainframe.

Figure 12:
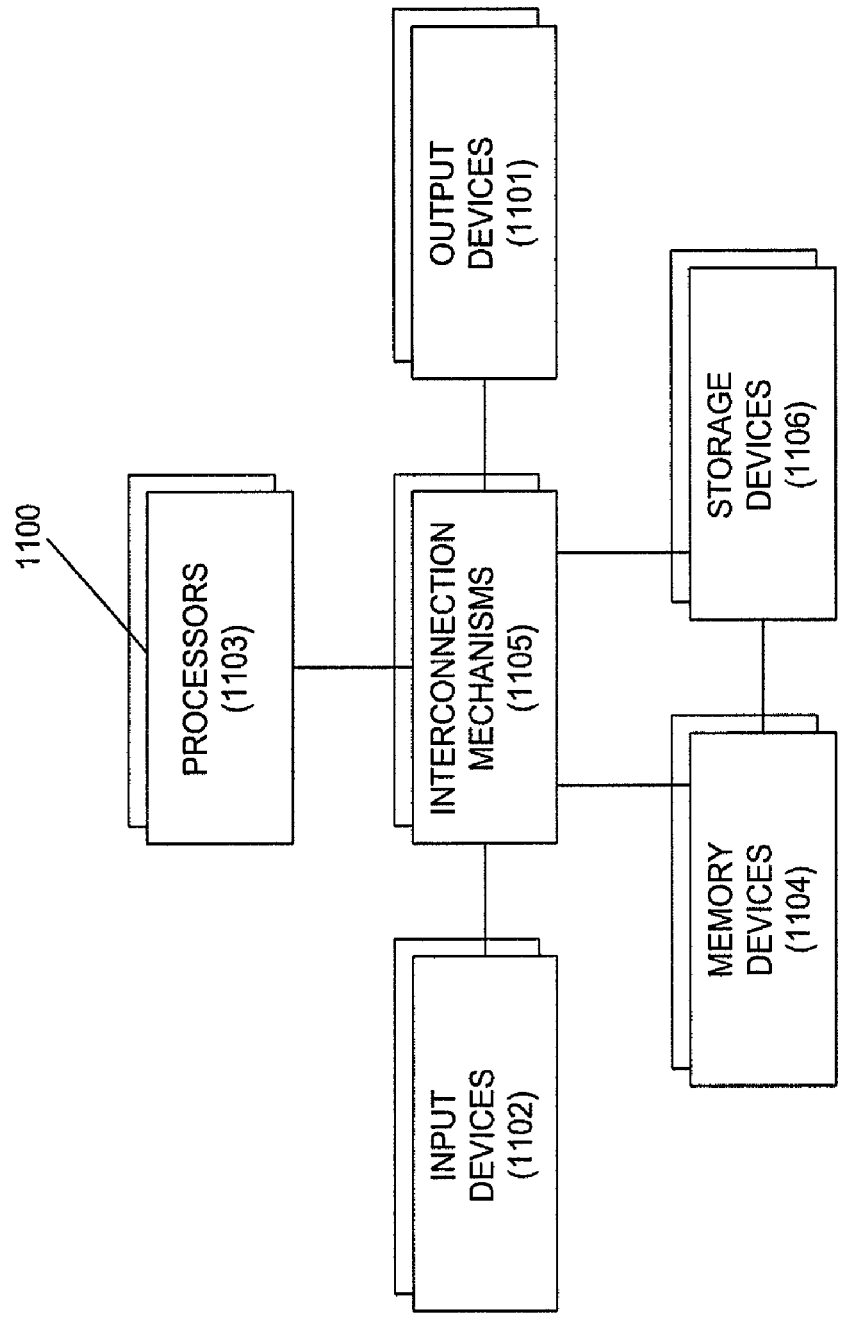
FIG. 12 depicts a general purpose computer system which may be configured into at least one embodiment in accordance with the present invention.

Although computer system 1100 is shown by way of example as one type of computer system upon which various aspects of the invention may be practiced, it should be appreciated that the invention is not limited to being implemented on the computer system as shown in FIG. 12. Various aspects of the invention may be practiced on one or more computers having a different architecture and/or components than that shown in FIG. 12. For instance, the computer system 1100 may include specially-programmed, special-purpose hardware, such as for example, an application-specific integrated circuit (ASIC) or field programmable gate array (FPGA) tailored to perform a particular operation disclosed herein, such as translating logical constraints to linear constraints. While another embodiment may perform the same function using several general-purpose computing devices running MAC OS System X with Motorola PowerPC processors and several specialized computing devices running proprietary hardware and operating systems.

Figure 14:
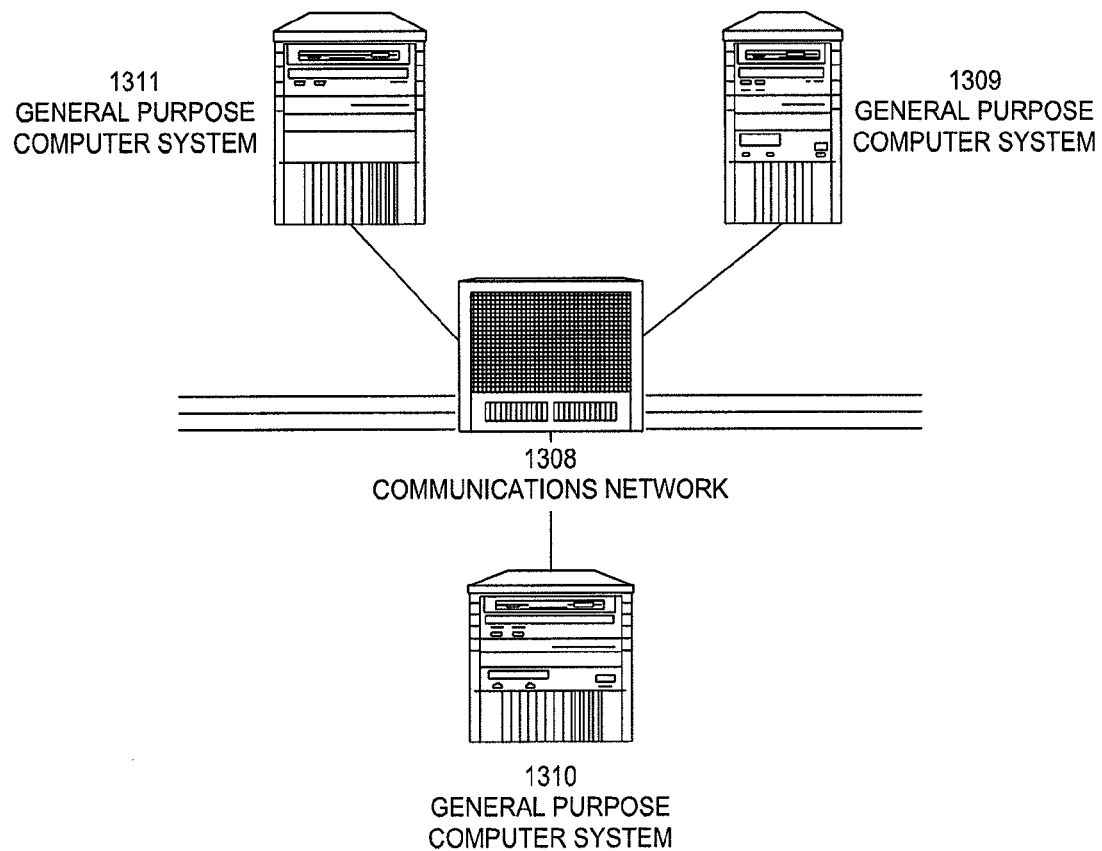
FIG. 14 shows a distributed computing system which may be configured into at least one embodiment in accordance with the present invention.

As depicted in FIG. 14, one or more portions of the system may be distributed to one or more computers (e.g., systems 1309-1311) coupled to communications network 1308. These computer systems 1309-1311 may also be general-purpose computer systems. For example, various aspects of the invention may be distributed among one or more computer systems configured to provide a service (e.g., servers) to one or more client computers, or to perform an overall task as part of a distributed system. More particularly, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP). To illustrate, one embodiment may accept logical constraint information though a browser interpreting HTML forms and may supply linear constraint information to other software using a data translation service running on a separate server.

Various embodiments of the present invention may be programmed using an object-oriented programming language, such as SmallTalk, Java, C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof. For example, a logical constraint user interface may be implemented using a Microsoft Word document while the application designed to solve optimization problems may be written in C++.

It should be appreciated that a general-purpose computer system in accord with the present invention may perform functions outside the scope of the invention. For instance, aspects of the system may be implemented using an existing commercial product, such as, for example, Database Management Systems such as SQL Server available from Microsoft of Seattle Wash., Oracle Database from Oracle of Redwood Shores, Calif., and MySQL from MySQL AB of UPPSALA, Sweden and WebSphere middleware from IBM of Armonk, N.Y. If SQL Server is installed on a general-purpose computer system to implement an embodiment of the present invention, the same general-purpose computer system may be able to support databases for sundry applications.

Based on the foregoing disclosure, it should be apparent to one of ordinary skill in the art that the invention is not limited to a particular computer system platform, processor, operating system, network, or communication protocol. Also, it should be apparent that the present invention is not limited to a specific architecture or programming language.

Any reference to examples, embodiments, elements or acts of the systems, machines and processes herein referred to in the singular may also embrace examples including a plurality of these elements, and any references in plural to any example, element or act herein may also embrace examples including only a single element. References in the singular or plural form are not intended to limit the presently disclosed systems, machines or processes, their components, acts, or elements.

Any embodiment disclosed herein may be combined with any other embodiment, and references to "an embodiment," "some embodiments," "an alternate embodiment," "various embodiments," "one embodiment," "at least one embodiment," "this and other embodiments" or the like are not necessarily mutually exclusive and are intended to indicate that a particular feature, structure, or characteristic described in connection with the embodiment may be included in at least one embodiment. Such terms as used herein are not necessarily all referring to the same embodiment. Any embodiment may be combined with any other embodiment in any manner consistent with the aspects disclosed herein. References to "or" may be construed as inclusive so that any terms described using "or" may indicate any of a single, more than one, and all of the described terms.

Where technical features in the drawings, detailed description or any claim are followed by references signs, the reference signs have been included for the sole purpose of increasing the intelligibility of the drawings, detailed description, and claims. Accordingly, neither the reference signs nor their absence are intended to have any limiting effect on the scope of any claim elements.

While specific embodiments in accordance with the present invention have been described herein for use with optimizing a set of projects, other embodiments deal with other resource allocation problems, such as the optimizing the number of transport vessels to include a fleet or the optimum amount and type of fuel to purchase to produce electricity for a base of customers. Further, at least some embodiments described herein may be used to translate logical constraints into linear constraints for any optimization problem that includes logical constraints.

Having thus described several aspects of at least one example of this invention, it is to be appreciated various alterations, modifications, and improvements will readily occur to those skilled in the art. Such alterations, modifications, and improvements are intended to be part of this disclosure, and are intended to be within the scope of the invention. Accordingly, the foregoing description and drawings are by way of example only.

What is claimed is:

1. A method for processing at least one logical constraint using a computer system, the computer system including an input, a computer readable data storage medium and a processor coupled to the input and the computer readable data storage medium, the at least one logical constraint including at least one logical expression, the method comprising:
storing, on the computer readable data storage medium, the at least one logical constraint;
translating, by the processor, the at least one logical constraint into at least one linear constraint via introduction of an auxiliary variable to substitute for at least one AND sub-expression having a depth equal to or less than 1; and
storing, on the computer readable data storage medium, the at least one linear constraint.

2. The method according to claim 1, wherein translating, by the processor, the at least one logical constraint includes simplifying the at least one logical expression.

3. The method according to claim 1, wherein translating, by the processor, the at least one logical constraint includes translating based at least in part on a translation formula.

4. The method according to claim 3, wherein translating based at least in part on a translation formula includes:
determining that the at least one logical expression has a depth equal to or less than 1; and
translating the at least one logical expression based at least in part on the translation formula.

5. The method according to claim 1, wherein translating, by the processor, the at least one logical constraint includes reducing the at least one logical expression to a depth equal to or less than 1.

6. The method according to claim 5, wherein reducing the at least one logical constraint includes:
determining that at least one sub-expression of the at least one logical expression is a leaf phrase; and
substituting at least one auxiliary variable for the at least one sub-expression.

7. The method according to claim 1, wherein translating, by the processor, the at least one logical constraint includes:
determining that at least one logical sub-expression of the at least one logical expression should be substituted with at least one auxiliary variable; and
substituting the at least one logical sub-expression with the at least one auxiliary variable.

8. The method according to claim 7, wherein determining that the at least one logical sub-expression should be substituted with the at least one auxiliary variable includes receiving an indication of the at least one logical expression via the input.

9. The method according to claim 7, wherein determining that the at least one logical sub-expression should be substituted with the at least one auxiliary variable includes comparing a characteristic of the at least one logical expression to a threshold value.

10. The method according to claim 7, further comprising storing, on the computer readable storage medium, a plurality of linear constraints, the plurality of linear constraints formulated to ensure logical equivalence between the at least one auxiliary variable and the at least one logical sub-expression.

11. The method according to claim 1, wherein translating, by the processor, the at least one logical constraint includes substituting a number of auxiliary variables for sub-expressions of the at least one logical expression, the sub-expressions having a depth equal to or less than 1.

12. The method according to claim 1, wherein translating, by the processor, the at least one logical constraint includes using a Boolean distributive law $a+b*c=(a+b)*(a+c)$ to reduce a depth of at least one sub-expression of the at least one logical expression.

13. The method according to claim 12, further comprising comparing a characteristic of the at least one sub-expression to a threshold value to determine that the at least one sub-expression should be replaced with a logically equivalent expression using the Boolean distributive law $a+b*c=(a+b)*(a+c)$.

14. The method according to claim 1, further comprising determining that the at least one logical AND sub-expression should be substituted with the auxiliary variable by comparing a characteristic of at least one of the at least one logical expression and the at least one logical AND sub-expression to a threshold value.

15. The method according to claim 14, wherein comparing the characteristic includes comparing a number of factors in the at least one logical AND sub-expression to the threshold value.

16. A system for processing at least one logical constraint comprising:
an input;
a computer readable data storage medium; and
a processor coupled to the input and the computer readable data storage medium and configured to:
store, on the computer readable data storage medium, the at least one logical constraint;
translate the at least one logical constraint into at least one linear constraint via introduction of an auxiliary variable to substitute for at least one AND sub-expression having a depth equal to or less than 1; and
store, on the computer readable data storage medium, the at least one linear constraint.

17. The system according to claim 16, wherein the processor configured to translate the at least one logical constraint is further configured to simplify the at least one logical expression.

18. The system according to claim 16, wherein the processor configured to translate the at least one logical constraint, is further configured to translate based at least in part on a translation formula.

19. The system according to claim 18, wherein the processor configured to translate based at least in part on a translation formula is further configured to:
determine that the at least one logical expression has a depth equal to or less than 1; and
translate the at least one logical expression based at least in part on the translation formula.

20. The system according to claim 19, wherein the processor configured to translate the at least one logical constraint is further configured to reduce the at least one logical constraint to a depth equal to or less than 1.

21. The system according to claim 20, wherein the processor configured to reduce the at least one logical constraint to a depth equal to or less than 1 is further configured to:
determine that at least one sub-expression of the at least one logical expression is a leaf phrase; and
substitute at least one auxiliary variable for the at least one sub-expression.

22. The system according to claim 16, wherein the processor configured to translate the at least one logical constraint is further configured to:

determine that the at least one logical sub-expression should be substituted with at least one auxiliary variable;

substitute the at least one logical sub-expression with the at least one auxiliary variable;

generate a plurality of linear constraints that are formulated to ensure equivalence between the at least one auxiliary variable and the at least one logical expression; and store, on the computer readable storage medium, the plurality of linear constraints.

23. The system according to claim 22, wherein the processor configured to determine that the at least one logical sub-expression should be substituted is further configured to receive an indication of the at least one logical sub-expression via the input.

24. The system according to claim 22 wherein the processor configured to determine that the at least one logical sub-expression should be substituted is further configured to compare a characteristic of the at least one logical sub-expression to a threshold value, wherein the at least one logical sub-expression is an AND sub-expression.

25. The system according to claim 24, wherein the processor configured to compare the characteristic of the at least one logical sub-expression to the threshold value is further configured to compare a number of factors in each phrase of the at least one logical expression to the threshold value.

26. The system according to claim 16, wherein the processor is further configured to solve an optimization problem including the at least one linear constraint.

27. The system according to claim 26, wherein a solution to the optimization problem reflects a set of activities from a plurality of activities, each of the set of activities having a value greater than values of activities from the plurality of activities not included in the set of activities.

28. The system according to claim 27, wherein the solution reflects a microproject stack.

29. A system for processing at least one logical constraint comprising:

an input;

a computer readable data storage medium; and means for translating the at least one logical constraint into at least one linear constraint, the means for translating the at least one logical constraint including means for substituting the at least one logical expression with at least one auxiliary variable and generating a plurality of linear constraints that are formulated to ensure equivalence between the at least one auxiliary variable and the at least one logical expression.

30. The system according to claim 29, wherein the means for translating the at least one logical constraint includes means for simplifying the at least one logical expression.

31. The system according to claim 29, wherein the means for translating the at least one logical constraint includes means for translating based at least in part on a translation formula.

32. The system according to claim 29, the means for translating the at least one logical constraint includes means for reducing the at least one logical constraint to a depth equal to or less than 1.

* * * * *